(12) United States Patent
Lee

(10) Patent No.: US 10,228,840 B2
(45) Date of Patent: Mar. 12, 2019

(54) METHOD OF CONTROLLING TOUCH FUNCTION AND AN ELECTRONIC DEVICE THEREOF

(71) Applicant: Samsung Electronics Co. Ltd., Suwon-si, Gyeonggi-do (KR)

(72) Inventor: Ho-Shin Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 13/975,762

(22) Filed: Aug. 26, 2013

(65) Prior Publication Data

US 2014/0059481 A1   Feb. 27, 2014

(30) Foreign Application Priority Data

Aug. 27, 2012   (KR) .................. 10-2012-0093986
Sep. 4, 2012    (KR) .................. 10-2012-0097771

(51) Int. Cl.
G06F 3/0481   (2013.01)
G06F 3/0482   (2013.01)
G06F 3/0483   (2013.01)
G06F 3/0485   (2013.01)
G06F 3/0488   (2013.01)

(52) U.S. Cl.
CPC .......... G06F 3/0488 (2013.01); G06F 3/0485 (2013.01); *G06F 2203/04806* (2013.01); *G06F 2203/04808* (2013.01)

(58) Field of Classification Search
CPC .... G06F 3/0481; G06F 3/0482; G06F 3/0483; G06F 3/04817; H04N 5/44543

USPC .......................... 715/810, 764, 784
See application file for complete search history.

(56) References Cited

U.S. PATENT DOCUMENTS 8,599,163 B2 * 12/2013 Liu .................. G06F 3/04886
                                              345/173
8,669,945 B2 *  3/2014 Coddington .......... G06F 3/0485
                                              345/173

(Continued)

FOREIGN PATENT DOCUMENTS

CN    101379461 A    3/2009
CN    101950212 A    1/2011

(Continued)

OTHER PUBLICATIONS

European Search Report dated Nov. 5, 2018; European Appln. No. 13 181 685.2-1216.

(Continued)

*Primary Examiner* — Kevin L Young
*Assistant Examiner* — Erik V Stitt
(74) *Attorney, Agent, or Firm* — Jefferson IP Law, LLP

(57) ABSTRACT

A method for operating an electronic device is provided. The method includes detecting at least one first touch on a displayed content region, determining an area of a first rectangle formed by the at least one first touch, determining an area of a second rectangle formed by at least one second touch moved from the at least one first touch, comparing the area of the first rectangle with the area of the second rectangle, determining a function of the touch on the content region, and displaying the content region corresponding to the determined function of the touch.

11 Claims, 19 Drawing Sheets

(56) References Cited

U.S. PATENT DOCUMENTS

| | | | |
|---|---|---|---|
| 8,754,911 B2 * | 6/2014 | Kim | G06F 3/0416 345/156 |
| 2003/0043174 A1 * | 3/2003 | Hinckley | G06F 3/03547 345/684 |
| 2007/0030255 A1 * | 2/2007 | Pak | G06F 3/044 345/173 |
| 2007/0120833 A1 | 5/2007 | Yamaguchi et al. | |
| 2007/0152984 A1 | 7/2007 | Ording et al. | |
| 2008/0168384 A1 | 7/2008 | Platzer et al. | |
| 2009/0066663 A1 * | 3/2009 | Chang | G06F 1/1615 345/173 |
| 2009/0100383 A1 * | 4/2009 | Sunday | G06F 3/04883 715/863 |
| 2009/0102804 A1 * | 4/2009 | Wong | G06F 3/03547 345/173 |
| 2009/0128516 A1 | 5/2009 | Rimon et al. | |
| 2010/0102804 A1 * | 4/2010 | Burkhardt | G01D 5/2455 324/207.25 |
| 2010/0115398 A1 | 5/2010 | Yi | |
| 2010/0302176 A1 * | 12/2010 | Nikula | G06F 3/04883 345/173 |
| 2011/0007027 A1 | 1/2011 | Chen et al. | |
| 2011/0187657 A1 * | 8/2011 | Knowles | G06F 3/0485 345/173 |
| 2011/0187750 A1 | 8/2011 | Ko et al. | |
| 2012/0146930 A1 * | 6/2012 | Lee | G06F 3/04883 345/173 |
| 2012/0192107 A1 | 7/2012 | Kwon | |
| 2012/0194559 A1 | 8/2012 | Lim | |
| 2012/0313869 A1 * | 12/2012 | Konami | G06F 3/04883 345/173 |
| 2013/0311916 A1 * | 11/2013 | Weng | G01C 21/005 715/764 |
| 2014/0005895 A1 * | 1/2014 | Entenmann | G06F 3/017 701/49 |
| 2015/0253856 A1 * | 9/2015 | de los Reyes | G06F 3/04883 345/173 |

FOREIGN PATENT DOCUMENTS

| | | |
|---|---|---|
| EP | 1 736 856 A2 | 12/2006 |
| JP | 2000-163031 A | 6/2000 |
| JP | 2007-128497 A | 5/2007 |
| JP | 2011-18335 A | 1/2011 |
| JP | 2011-503709 A | 1/2011 |
| KR | 10-2012-0018397 A | 3/2012 |
| WO | 2009-060454 A2 | 5/2009 |

OTHER PUBLICATIONS

Korean Office Action with English translation dated Nov. 30, 2018; Korean Appln. No. 10-2012-0097771.

* cited by examiner

METHOD OF CONTROLLING TOUCH FUNCTION AND AN ELECTRONIC DEVICE THEREOF

PRIORITY

This application claims the benefit under 35 U.S.C. § 119(a) of a Korean patent application filed on Aug. 27, 2012 in the Korean Intellectual Property Office and assigned Serial No. 10-2012-0093986 and of a Korean patent application filed on Sep. 4, 2012 in the Korean Intellectual Property Office and assigned Serial No. 10-2012-0097771, the entire disclosure of each of which is hereby incorporated by reference.

BACKGROUND OF THE INVENTION

1. Field of the Invention

The present invention relates to a method for controlling a touch function according to a touch and/or a drag on a content region of a touchscreen in an electronic device, and an electronic device thereof.

2. Description of the Related Art

As an electronic device employing a touch input method has been developed, a user can easily scroll or magnify/de-magnify content displayed on a touchscreen of the electronic device by touching an arbitrary area of the electronic device. For example, the user may scroll the content by touching an arbitrary area on the content displayed on the touchscreen of the electronic device, or magnify or de-magnify the content by a desired size.

However, an electronic device of the related art first determines whether a touch input on a touch region is a single touch input or multi touch input, and determines whether a touch input operation is an operation for scrolling content displayed on the touchscreen or magnifying or de-magnifying the content displayed on the touchscreen. Since different algorithms are applied according to respective cases, the electronic device requires a very complex algorithm to recognize one operation.

Accordingly, there is a need for a method for scrolling content displayed on the touchscreen of the electronic device or easily magnifying/de-magnifying a region of content.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for determining whether there occurs an event for magnifying/de-magnifying a region of content displayed on a touchscreen according to a change in a touch region.

Another aspect of the present invention is to provide an apparatus and method for adjusting scrolling of content displayed on a touchscreen or magnification/de-magnification of a content region according to a variation in the area (size) of a touch region according to movement of a touch.

Another aspect of the present invention is to provide an apparatus and method for adjusting scrolling of content displayed on a touchscreen or magnification/de-magnification of a content region according to a change in the number of pixels included in a touch region according to movement of a touch.

In accordance with an aspect of the present invention, a method for operating an electronic device is provided. The method includes detecting at least one first touch on a displayed content region, determining an area of a first rectangle formed by the at least one first touch, determining an area of a second rectangle formed by at least one second touch moved from the at least one first touch, comparing the area of the first rectangle with the area of the second rectangle, determining a function of the touch on the content region, and displaying the content region corresponding to the determined function of the touch.

In accordance with another aspect of the present invention, an electronic device is provided. The electronic device includes a touchscreen, at least one processor, a memory, and a program stored in the memory and executed by the processor, the program performing: detecting at least one first touch on a displayed content region, determining an area of a first rectangle formed by the at least one first touch, determining an area of a second rectangle formed by at least one second touch moved from the at least one first touch, comparing the area of the first rectangle with the area of the second rectangle, determining a function of the touch on the content region, and displaying the content region corresponding to the determined function of the touch.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1A to 1D are diagrams schematically illustrating scrolling or magnifying/de-magnifying a displayed content region according to an exemplary embodiment of the present invention.

Figure 1A:
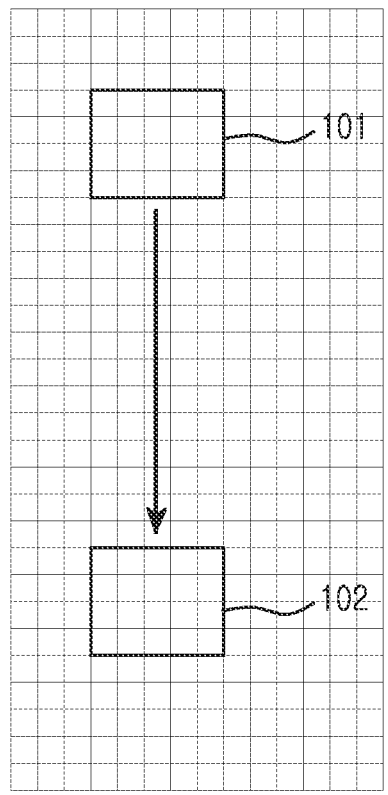
FIGS. 1A to 1D are diagrams schematically illustrating scrolling or magnifying/de-magnifying a displayed content region according to an exemplary embodiment of the present invention.

More specifically, FIG. 1A is a diagram schematically illustrating display of content that is scrolled down according to an exemplary embodiment of the present invention.

Referring to FIG. 1A, the electronic device may detect, for example, 16 distinct touches. The electronic device detects at least one touch input on a region of content displayed on a touchscreen (hereinafter, also referred to as a content region). The electronic device compares the X coordinate values and Y coordinate values of the respective detected touch inputs, and determines the maximum value and minimum value of the X coordinate values and the maximum value and minimum value of the Y coordinate values. Thereafter, the electronic device sets a second rectangle (box) 101 defined by the maximum and minimum coordinate values. When one touch input is generated, there is one X coordinate value and one Y coordinate value. Therefore, in this case, a minimum unit of rectangle may be defined around the X and Y coordinate values.

Thereafter, the electronic device determines the area (size) of a third rectangle (box) 102 defined by the maximum and minimum values of the X and Y coordinates of touch points generated as at least one touch of the touch inputs is moved (i.e., dragged). In an exemplary implementation, what is used as a variable is the area of the third rectangle (box) 102 formed by the maximum and minimum values of the X and Y coordinates of the touch points. The determined area of the third rectangle 102 is compared with the area of the second rectangle 101. When the difference between the area of the third rectangle 102 and the area of the second rectangle 101 is smaller than a threshold, the movement of the touch is determined as a scrolling input of the content region. In this case, the content region is scrolled and displayed. In the illustrated example of FIG. 1A, the scrolling corresponds to scrolling down.

The threshold is a value determined in advance according to the function settings of the electronic device, and may be changed according to the user's settings.

The touch that forms the second rectangle may be a plurality of touches, and the plurality of touches may include a first touch generated first on the region of content displayed on the screen of the electronic device. As described with reference to FIG. 1A, this may be regarded as an event for scrolling or magnifying/de-magnifying the content region displayed on the touchscreen.

The region of the content displayed on the touchscreen of the electronic device may indicate an object displayed on the touchscreen of the electronic device. The object may be a graphical object.

Figure 1B:
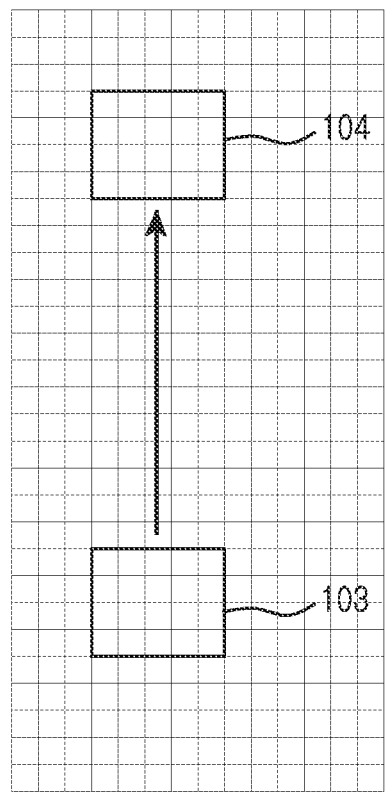

FIG. 1B is a diagram schematically illustrating display of content that is scrolled up according to an exemplary embodiment of the present invention.

Referring to FIG. 1B, the electronic device detects at least one touch input on a region of content displayed on a touchscreen, and compares the X coordinate values and Y coordinate values of the respective detected touch inputs. Thereafter, the electronic device determines the maximum value and minimum value of the X coordinate values and the maximum value and minimum value of the Y coordinate values, and sets a second rectangle (box) 103 defined by the maximum and minimum coordinate values. When one touch input is generated, there is one X coordinate value and one Y coordinate value. Therefore, in this case, a minimum unit of rectangle may be defined around the X and Y coordinate values.

Thereafter, the electronic device determines the area of a third rectangle (box) 104 formed by the maximum and minimum values of the X and Y coordinates of touch points generated as the at least one touch is moved (i.e., dragged). The determined area of the third rectangle 104 is compared with the area of the second rectangle 103. When the difference between the area of the third rectangle 104 and the area of the second rectangle 103 is below a threshold, the movement of the touch is determined as a scrolling of the content region. In this case, the content region is scrolled and displayed. In the illustrated example of FIG. 1B, the scrolling corresponds to scrolling up.

The threshold is a value determined in advance according to the function settings of the electronic device, and may be changed according to the user's settings.

The touch that forms the second rectangle 103 may be a plurality of touches, and the plurality of touches may include a first touch generated first on the region of content displayed on the screen of the electronic device. As described with reference to FIG. 1A, this may be regarded as an event for scrolling or magnifying/de-magnifying the content region displayed on the touchscreen.

The region of the content displayed on the touchscreen of the electronic device may indicate an object displayed on the touchscreen of the electronic device. The object may be a graphical object.

Figure 1C:
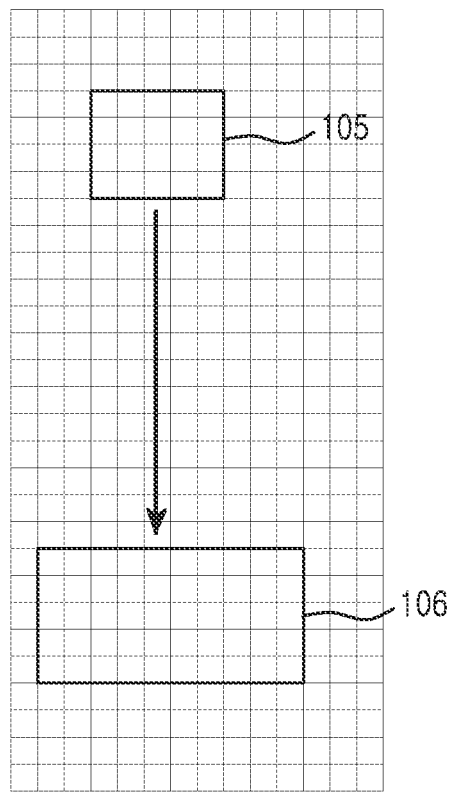

FIG. 1C is a diagram schematically illustrating display of content that is magnified according to an exemplary embodiment of the present invention.

Referring to FIG. 1C, the electronic device detects at least one touch input on a region of content displayed on a touchscreen, and compares the X coordinate values and Y coordinate values of the respective detected touch inputs. Thereafter, the electronic device determines the maximum value and minimum value of the X coordinate values and the maximum value and minimum value of the Y coordinate values, and sets a second rectangle (box) 105 defined by the maximum and minimum coordinate values. Thereafter, the electronic device determines the area of a third rectangle (box) 106 formed by the maximum and minimum values of the X and Y coordinates of touch points generated as the at least one touch is moved (i.e., dragged). When the area of the third rectangle 106 is greater than the area of the second rectangle 105 by more than a threshold, the movement of the touch is determined as the magnification (zoom-in) of the content region. In this case, the content region is magnified and displayed.

A magnification ratio of the content region may be proportional to the difference between the area of the third rectangle 106 and the area of the second rectangle 105. The proportion may be one-dimensional proportion or multi-dimensional proportion. That is, a magnification value of the content region may be defined by a linear equation or multi-dimensional equation having, as a variable, the difference between the area of the third rectangle 106 and the area of the second rectangle 105.

Instead of the areas of the second rectangle 105 and third rectangle 106, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

The threshold is a value determined in advance according to the function settings of the electronic device, and may be changed according to the user's settings.

The second touch that forms the second rectangle 105 may be a plurality of touches, and the plurality of touches may include a first touch generated first on the region of content displayed on the screen of the electronic device. As will be described with reference to FIG. 4A, this may be regarded as an event for scrolling or magnifying/de-magnifying the content region displayed on the touchscreen.

The magnification of the region of the content displayed on the touchscreen of the electronic device may be adjusting a parameter of an object displayed on the touchscreen of the electronic device to a greater extent.

Figure 1D:
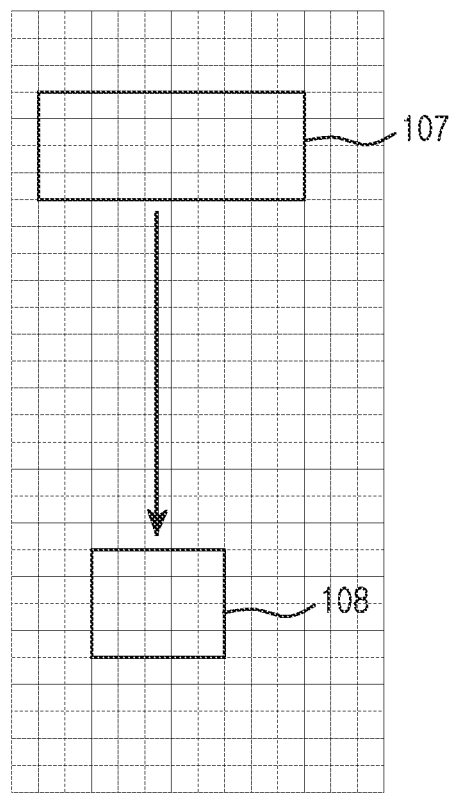

FIG. 1D is a diagram schematically illustrating display of content that is de-magnified according to an exemplary embodiment of the present invention.

Referring to FIG. 1D, the electronic device detects at least one touch input on a region of content displayed on a touchscreen, and compares the X coordinate values and Y coordinate values of the respective detected touch inputs. Thereafter, the electronic device determines the maximum value and minimum value of the X coordinate values and the maximum value and minimum value of the Y coordinate values, and sets a second rectangle (box) 107 defined by the maximum and minimum coordinate values. Thereafter, the electronic device determines the area of a third rectangle (box) 108 formed by the maximum and minimum values of the X and Y coordinates of touch points generated as the at least one touch is moved (i.e., dragged). When the area of the third rectangle 108 is smaller than the area of the second rectangle 107 by more than a threshold, the movement of the touch is determined as the de-magnification (zooming-out) of the content region. In this case, the content region is de-magnified and displayed.

A de-magnification ratio of the content region may be proportional to the difference between the area of the third rectangle 108 and the area of the second rectangle 107. The proportion may be one-dimensional proportion or multi-dimensional proportion. That is, a de-magnification value of the content region may be defined by a linear equation or multi-dimensional equation having, as a variable, the difference between the area of the third rectangle 108 and the area of the second rectangle 107.

Instead of the areas of the second rectangle 107 and third rectangle 108, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

The threshold is a value determined in advance according to the function settings of the electronic device, and may be changed according to the user's settings.

The second touch that forms the second rectangle 107 may be a plurality of touches, and the plurality of touches may include a first touch generated first on the region of content displayed on the screen of the electronic device. As will be described with reference to FIG. 4A, this may be regarded as an event for scrolling or magnifying/de-magnifying the content region displayed on the touchscreen.

The de-magnification of the region of the content displayed on the touchscreen of the electronic device may be adjusting a parameter of an object displayed on the touchscreen of the electronic device to a lesser extent.

Figure 4A:
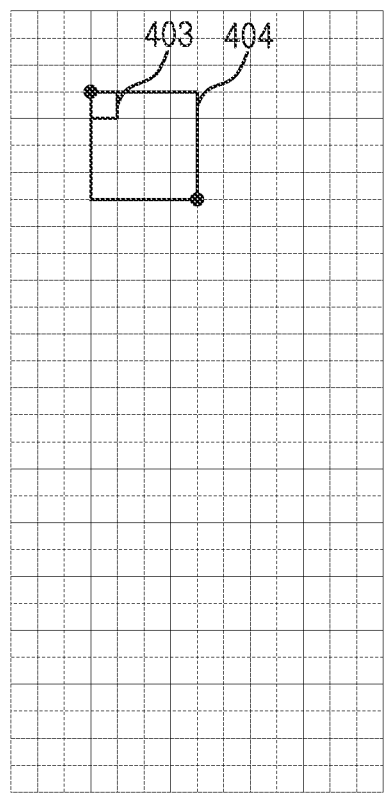
FIG. 4A is a diagram illustrating a method for determining whether there occurs an event for scrolling or magnifying/de-magnifying a region of content displayed on a touchscreen according to a variation in a touch region according to an exemplary embodiment of the present invention.

Referring again to FIG. 1C, a condition of magnifying the region of content displayed on the touchscreen may be set differently. That is, a condition in which the area of a rectangle exceeds a reference value may be given as a condition of magnification of the region of content displayed. For example, when the reference value for the area of a rectangle is set to 4 cm$^2$, the displayed content region is magnified from a time point at which the area of the second rectangle 105 exceeds the reference value (it is assumed that the area of a first rectangle which will be described below with reference to FIG. 4A is equal to or smaller than the reference value). The magnification ratio for the content region may depend on a ratio at which the area of the second rectangle 105 exceeds the reference value. If the area of the first rectangle is equal to or greater than the reference value, the displayed content region is magnified from a time point at which the area of the second rectangle 105 exceeds the area of the first rectangle. The magnification ratio for the content region may depend on a ratio at which the area of the second rectangle 105 exceeds the area of the first rectangle.

Referring again to FIG. 1D, a condition in which the area of a rectangle is smaller than the reference value may be given as a condition for de-magnification of the displayed content region (it is assumed that the area of the first rectangle which will be described below with reference to FIG. 4A is equal to or greater than the reference value).

The above-described two conditions for magnification of the displayed content region may be used together. That is, the condition in which the area of a rectangle exceeds a reference value, and the condition in which the area of a third rectangle increases to be greater than the area of a second rectangle by more than a preset second threshold may be determined as conditions for magnification of the region of content displayed on the touchscreen. That is, the condition in which the area of a rectangle is smaller than a reference value, and the condition in which the area of the third rectangle decreases to be smaller than the area of the second rectangle by more than a preset second threshold may be determined as conditions for de-magnification of the region of content displayed on the touchscreen.

Figure 2:
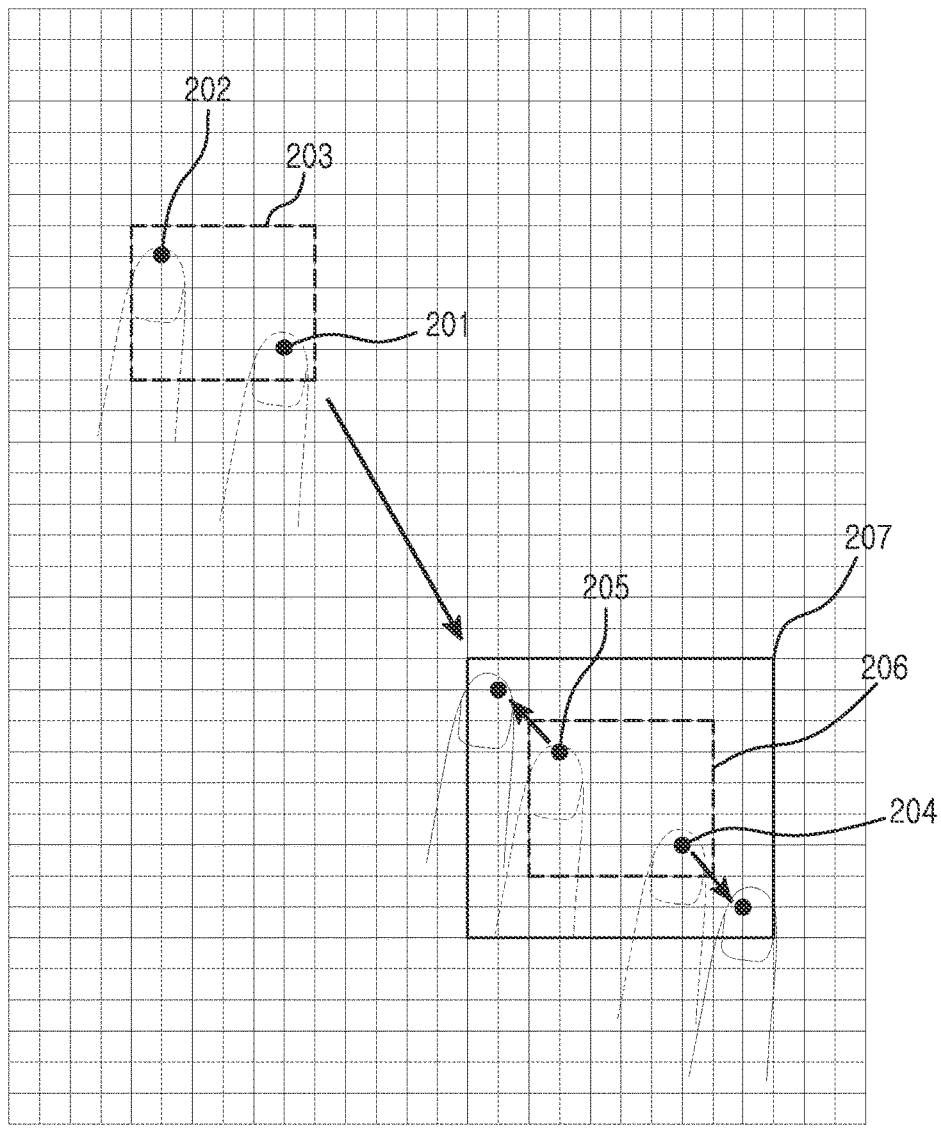
FIG. 2 is a diagram schematically illustrating reception of two touch inputs and magnifying displayed content according to an exemplary embodiment of the present invention.

FIG. 2 is a diagram schematically illustrating reception of two touch inputs and magnifying displayed content according to an exemplary embodiment of the present invention.

Referring to FIG. 2, the electronic device detects two touch inputs 201 and 202 on a region of content displayed on a touchscreen, and compares the X coordinate values and Y coordinate values of the respective detected touch inputs. Thereafter, the electronic device determines the maximum value and minimum value (in this exemplary embodiment, the maximum X coordinate value and the minimum X coordinate value are offset from each other by a constant distance) of the X coordinate values and the maximum value and minimum value (in this exemplary embodiment, the maximum Y coordinate value and the minimum Y coordinate value are offset from each other by a constant distance) of the Y coordinate values, and sets a second rectangle (box) 203 defined by those coordinate values. Thereafter, the electronic device determines an area of a third rectangle (box) 207 formed by the maximum and minimum values (are offset from each other by a constant distance) of the X and Y coordinates of touch points generated as the two touches 204 and 205 are moved (i.e., dragged). As illustrated in FIG. 2, the area of the third rectangle 207 is greater than the area of the second rectangle 203. That is, the difference between the maximum value and minimum value of the X or Y coordinates is greater than that before the touch movement. When the area difference between the rectangles (e.g., difference between area of rectangle 206, which has the same area as the area of second rectangle 203, and third rectangle 207) exceeds a preset threshold, the movement of the touch is determined as a magnification (zoom-in) of the content region. In this case, the content region is magnified and displayed on the touchscreen.

A magnification or de-magnification ratio of the content region may be proportional to the difference between the area of the third rectangle 207 and the area of the second rectangle 203. The proportion may be one-dimensional proportion or multi-dimensional proportion. That is, a magnification value or de-magnification value of the content region may be defined by a linear equation or multi-dimensional equation having, as a variable, the difference between the area of the third rectangle 207 and the area of the second rectangle 203.

Instead of the areas of the second rectangle 203 and third rectangle 207, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

The threshold is a value determined in advance according to the function settings of the electronic device, and may be changed according to the user's settings.

The second touch that forms the second rectangle may be a plurality of touches, and the plurality of touches may include a first touch generated first on the region of content displayed on the screen of the electronic device. As will be described with reference to FIG. 4A, this may be regarded as an event for scrolling or magnifying/de-magnifying the content region displayed on the touchscreen.

The magnification of the region of content displayed on the touchscreen of the electronic device may be adjusting a parameter of an object displayed on the touchscreen of the electronic device to a greater extent.

Figure 3:
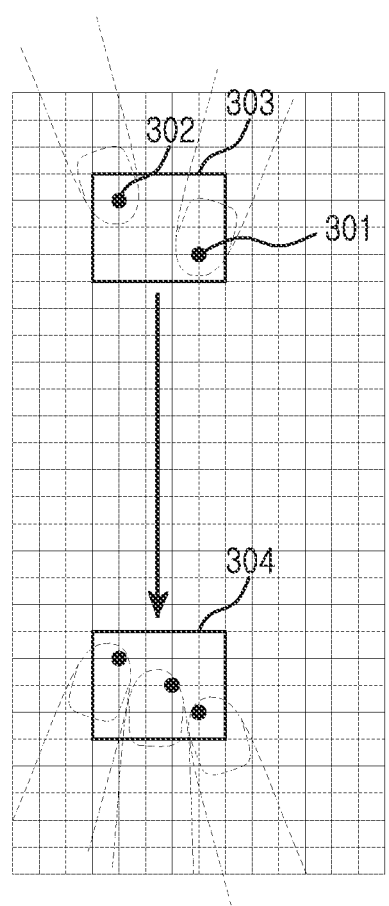
FIG. 3 is a diagram schematically illustrating reception of multi touch inputs and scrolling displayed content according to an exemplary embodiment of the present invention.

FIG. 3 is a diagram schematically illustrating reception of multi touch inputs and scrolling displayed content according to an exemplary embodiment of the present invention.

Referring to FIG. 3, the electronic device detects two touch inputs 301 and 302 on a region of content displayed on a touchscreen. The electronic device compares the X coordinate values and Y coordinate values of the respective detected touch inputs, and determines the maximum value and minimum value of the X coordinate values and the maximum value and minimum value of the Y coordinate values. Thereafter, the electronic device sets a second rectangle (box) 303 defined by the maximum and minimum coordinate values. When the two touches are moved (i.e., dragged) and a touch is additionally generated, the electronic device determines the area of a third rectangle (box) 304 formed by the maximum and minimum values of the X and Y coordinates of the three touch points. When the difference between the area of the third rectangle 304 and the area of the second rectangle 303 is below a threshold, the movement of the touch is determined as a scrolling of the content region. In this case, the content region is scrolled and displayed. The scrolling corresponds to scrolling down.

The threshold is a value determined in advance according to the function settings of the electronic device, and may be changed according to the user's settings.

The touch that forms the second rectangle 303 may be a plurality of touches, and the plurality of touches may include a first touch generated first on the region of content displayed on the screen of the electronic device. As described with reference to FIG. 4A, this may be regarded as an event for scrolling or magnifying/de-magnifying the content region displayed on the touchscreen.

The region of the content displayed on the touchscreen of the electronic device may indicate an object displayed on the touchscreen of the electronic device. The object may be a graphical object.

FIG. 4A is a diagram illustrating a method for determining whether there occurs an event for scrolling or magnifying/de-magnifying a region of content displayed on a touchscreen according to a variation in a touch region according to an exemplary embodiment of the present invention.

Referring to FIG. 4A, when a first touch is input on a region of content displayed on the screen of an electronic device, a first rectangle 403 is generated around a point of the first touch. An exemplary method for forming a rectangle will be described below with reference to FIGS. 4B and 5. When the point of the first touch is precisely coincident with a point on a coordinate system, the area of the first rectangle may be 0 (zero).

In addition, the first rectangle 403 may or may not be displayed on the touchscreen. When a second touch is input within a certain time after the first touch (the certain time is a time interval during which a user is completely unaware there is time discontinuity, for example, 150 ms or less and may be determined in advance), a second rectangle 404 having four vertexes may be formed by determining maximum and minimum values based on the X and Y coordinate values of the first and second touch points. The second rectangle 404 may or may not be displayed on the touchscreen.

A plurality of touches input may be further input within the certain time even after the second touch. When the plurality of touches are further input within the certain time, the electronic device may determine maximum and minimum values based on the X and Y coordinate values of the plurality of touch points and form a second rectangle having four vertexes. In this case, the plurality of touches are collectively referred to as a second touch.

Thereafter, the electronic device compares the area (size) of the first rectangle 403 with the area of the second rectangle 404. When the area of the second rectangle 404 is greater than a first threshold, the first and second touches are regarded as an event for scrolling or magnifying/de-magnifying the region of content displayed on the touchscreen.

Hereinafter, the first touch and the second touch will also be collectively referred to as a second touch. For example, in descriptions associated with FIGS. 1A, 1B, 1C, 1D, 2, 3, 10, 11, 12, 13, 14 and 15, the second touch may include the above-described first and second touches.

Thereafter, when the second touch is moved (i.e., dragged) and third touches are generated, the area of the second rectangle is compared with the area of a third rectangle having four vertexes defined according to the X coordinate and Y coordinate maximum and minimum values of the respective coordinates of the third touch points. In addition, the third rectangle may or may not be displayed on the touchscreen. When the area of the third rectangle is greater than the area of the second rectangle by more than a preset second threshold (also expressed as an offset), the region of content displayed on the touchscreen is magnified by the second touch and the third touches according to the variation ratio between areas. An example in which the area of the third rectangle is greater than the area of the second rectangle by more than a preset threshold is illustrated in FIG. 1C. When the area of the third rectangle is smaller than the area of the second rectangle by more than a preset second threshold (also expressed as an offset), the region of content displayed on the touchscreen is de-magnified by the second touch and the third touches according to the variation ratio between areas. An example in which the area of the third rectangle is smaller than the area of the second rectangle by more than a preset threshold is illustrated in FIG. 1D.

The threshold may be determined in consideration of the area of the touchscreen.

A magnification or de-magnification ratio of the content region may be proportional to the difference between the area of the third rectangle and the area of the second rectangle. The proportion may be one-dimensional proportion or multi-dimensional proportion. That is, a magnification or de-magnification value of the content region may be defined by a linear equation or multi-dimensional equation having, as a variable, the difference between the area of the third rectangle and the area of the second rectangle.

A condition of magnifying the region of content displayed on the touchscreen may be set differently. That is, a condition in which the area of a rectangle exceeds a reference value may be given as a condition of magnification of the region of content displayed. For example, when the reference value for the area of a rectangle is set to 4 $cm^2$, the region of content displayed is magnified from a time point at which the area of the second rectangle exceeds the reference value (it is assumed that the area of a first rectangle is equal to or smaller than the reference value). The magnification ratio for the content region may depend on a ratio at which the area of the second rectangle exceeds the reference value. If the area of the first rectangle is equal to or greater than the reference value, the displayed content region is magnified from a time point at which the area of the second rectangle exceeds the area of the first rectangle. The magnification ratio for the content region may depend on a ratio at which the area of the second rectangle exceeds the area of the first rectangle. A condition in which the area of a rectangle is smaller than the reference value may be given as a condition for de-magnification of the displayed content region (it is assumed that the area of the first rectangle which will be described below with reference to FIG. 4A is equal to or greater than the reference value).

Further, the above-described two conditions for magnification of the displayed content region may be used together. That is, the condition in which the area of a rectangle exceeds a reference value, and the condition in which the area of the third rectangle increases to be greater than the area of the second rectangle by more than a preset second threshold may be determined as conditions for magnification of the region of content displayed on the touchscreen. That is, the condition in which the area of a rectangle is smaller than a reference value, and the condition in which the area of the third rectangle decreases to be smaller than the area of the second rectangle by more than a preset second threshold may be determined as conditions for de-magnification of the region of content displayed on the touchscreen.

Instead of the areas of the second rectangle and third rectangle, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

Figure 4B:
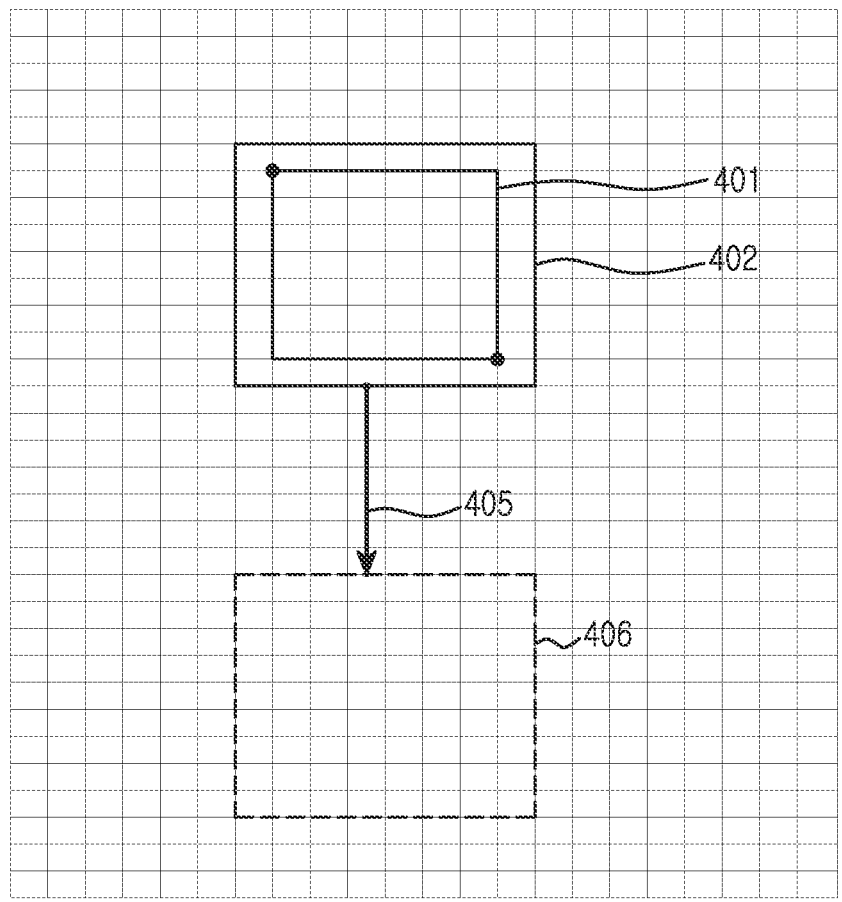
FIG. 4B is a diagram illustrating a method for determining a rectangle of a touch region according to an exemplary embodiment of the present invention.

FIG. 4B is a diagram illustrating a method for determining a rectangle of a touch region according to an exemplary embodiment of the present invention.

Referring to FIG. 4B, a rectangle 401 may be formed by determining maximum and minimum values based on the X and Y coordinates values which are within a range defined by the coordinate values of points of the two touch inputs on the region of content displayed on the touchscreen. In addition, a rectangle 402 may be formed by determining maximum and minimum values based on the X and Y coordinates values which are out of and close to the range defined by the coordinate values of points of the two touch inputs on the region of content displayed on the touchscreen.

The rectangles 401 and 402 may be defined as a region generated based on the number of pixels included in the two touch regions detected by the two touch inputs on the region of content displayed on the touchscreen.

In the case where the rectangle 401 is defined, when the two touches are moved (405) to form another rectangle 406, the area of the rectangle 401 is compared with the area of the other rectangle 406. When the area of the other rectangle 406 is greater than that of the rectangle 401, the region of content displayed on the touchscreen is magnified.

Figure 5:
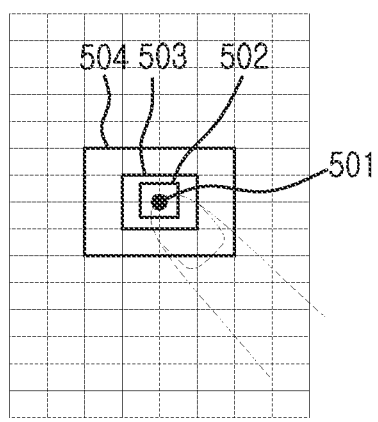
FIG. 5 is a diagram illustrating generation of a set region when a first touch input is received according to an exemplary embodiment of the present invention.

FIG. 5 is a diagram illustrating generation of a set region when a first touch is input according to an exemplary embodiment the present invention.

First, an electronic device according to the present invention may receive a touch input on at least one region of a displayed content region from a user. More specifically, the electronic device may receive one touch or two touches on the region of content displayed on the touchscreen. A method for generating the set region when one touch is received on the region of content displayed on the touchscreen according to an exemplary embodiment will be described below.

Referring to FIG. 5, the set region may be defined as a region generated based on pixels included in a region detected by one touch input on the region of content displayed on the touchscreen. First, the electronic device may detect that one region is touched on the region of content displayed on the touchscreen, and detect a pixel intersection (an intersection of X axis and Y axis) closest to the touch region. For example, when receiving the touch input on any one pixel, the electronic device may detect the pixel intersection closest to the center of the touch region. Thereafter, the electronic device may generate the set region such that at least one pixel is included around the detected pixel intersection. For example, as illustrated in FIG. 5, when detecting the pixel intersection 501, the electronic device may generate the set region 502 to include one pixel around the detected pixel intersection 501. That is, the electronic device may generate the set region 502 with pixels included in a quarter area among four pixels around the detected pixel intersection 501. In another example, the electronic device may generate the set region 503 to include four pixels around the detected pixel intersection 501. That is, the electronic device may generate the set region 503 with four pixels around the detected pixel intersection 501. In another example, the electronic device may generate the set region 504 to include 16 pixels around the detected pixel intersection 501. That is, the electronic device may generate the set region 504 with 16 pixels around the detected pixel intersection 501. As a result, when receiving one touch input, the electronic device may generate the set region to include at least one pixel around the detected pixel intersection. However, when the point of one touch is precisely coincident with the pixel intersection on coordinates, the area of the rectangle may be 0 (zero).

Figure 6:
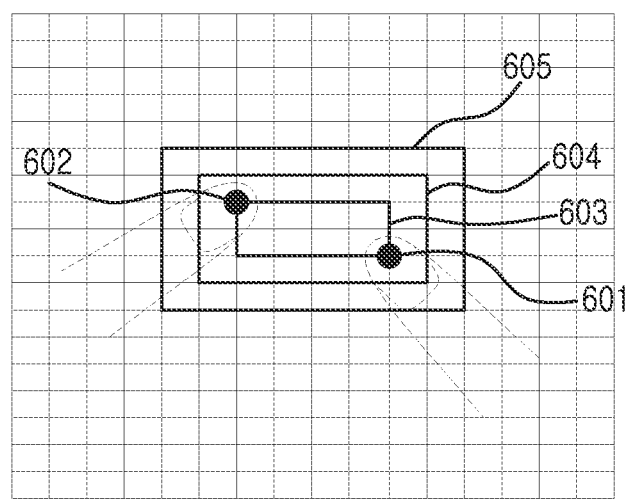
FIG. 6 is a diagram illustrating generation of a set region when two touch inputs are received according to an exemplary embodiment of the present invention.

FIG. 6 is a diagram illustrating generation of a set region when two touch inputs are received according to an exemplary embodiment of the present invention.

First, an electronic device according to the present invention may receive a touch input on at least one region of a region of content displayed. More specifically, the electronic device may receive single touch on one region or dual touches on two regions of the region of content displayed on the touchscreen. A method for generating a set region when dual (two) touches are received on two regions of the region of content displayed on a touchscreen according to an exemplary embodiment will be described below.

Referring to FIG. 6, the set region may be defined as a region generated based on pixels included in dual touch regions detected by two touch inputs on the region of content displayed on the touchscreen. First, the electronic device may detect that two regions are touched on the region of content displayed on the touchscreen, and detect a first pixel intersection 601 and a second pixel intersection 602 respectively closest to the touch regions. More specifically, when detecting that two regions are touched on content displayed on the touchscreen, the electronic device may detect the first pixel intersection 601 and the second pixel intersection 602 that are pixel intersections respectively closest to the touch regions. Thereafter, the electronic device may generate the set region that has a diagonal line connecting the detected first pixel intersection 601 and second pixel intersection 602 and includes at least one pixel. Thereafter, the electronic device may generate a set region 603 that has a diagonal line connecting the detected first pixel intersection 601 and second pixel intersection 602 and includes eight pixels (four vertical pixels and 2 horizontal pixels). In another example, the electronic device may generate a set region 604 that has a diagonal line connecting the detected first pixel intersection 601 and second pixel intersection 602 and includes a total of 24 pixels (six vertical pixels and four horizontal pixels). In another example, the electronic device may generate a set region 605 that has a diagonal line connecting the detected first pixel intersection 601 and second pixel intersection 602 and includes a total of 48 pixels (eight vertical pixels and six horizontal pixels). As a result, the electronic device may generate the set region that has a diagonal line connecting the detected first pixel intersection 601 and second pixel intersection 602 and includes at least one pixel.

Figure 7A:
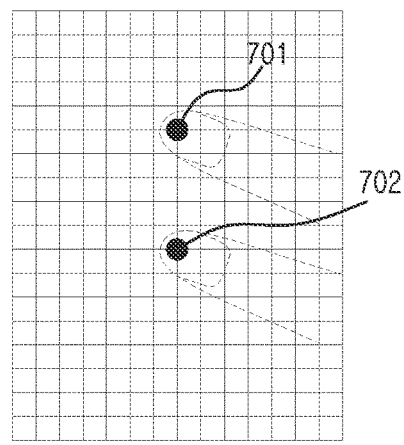
FIGS. 7A and 7B are diagrams illustrating use of an offset when it is determined that the X coordinate of a first pixel intersection is coincident with that of a second pixel intersection according to an exemplary embodiment of the present invention.
Figure 7B:
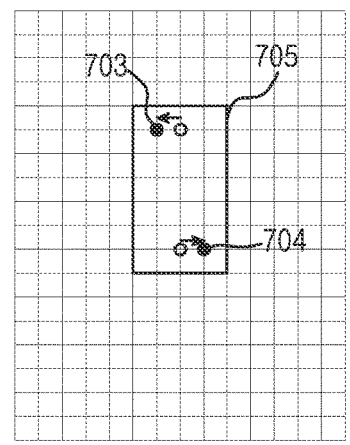

FIGS. 7A and 7B are diagrams illustrating use of an offset when it is determined that the X coordinate of a first pixel intersection is coincident with that of a second pixel intersection according to an exemplary embodiment of the present invention.

Referring to FIG. 7A, the electronic device may detect that two regions are touched on the region of content displayed on the touchscreen, and detect a first pixel intersection 701 and a second pixel intersection 702 respectively closest to the touch regions. More specifically, when detecting that two regions are touched on content displayed on the touchscreen, the electronic device may detect the first pixel intersection 701 and the second pixel intersection 702 that are pixel intersections respectively closest to the touch regions. Thereafter, the electronic device may generate a rectangle that is a region set that has a diagonal line connecting the detected first pixel intersection 701 and second pixel intersection 702 and includes at least one pixel.

However, as illustrated in FIG. 7A, when it is determined that the X coordinate of the detected first pixel intersection 701 is coincident (i.e., collinear) with that of the detected second pixel intersection 702, the electronic device cannot generate the set region. More specifically, the electronic device performs an algorithm for generating the set region that has the diagonal line connecting the first pixel intersection 701 first detected and second pixel intersection 702. If the first pixel intersection 701 is coincident with the second pixel intersection 702, a problem that the algorithm cannot be performed may occur. Accordingly, when it is determined that the detected first pixel intersection 701 is coincident with the second pixel intersection 702, the electronic device may apply an offset to their respective X coordinates. More specifically, the electronic device may subtract a set $\alpha$ value from the X coordinate value of the first pixel or add the set $\alpha$ value to the X coordinate value of the second pixel. For example, it is assumed that the X coordinate of the first pixel detected in the electronic device is X1, and the X coordinate of the detected second pixel is also X1. As in the above-described assumption, when the X coordinate of the first pixel is coincident with the X coordinate of the second pixel as X1, the electronic device may subtract the set $\alpha$ value from the X coordinate value X1 of the first pixel, or add the set $\alpha$ value to the X coordinate value X1 of the second pixel. Accordingly, the electronic device may obtain a value X1−$\alpha$ as the X coordinate value of the first pixel intersection and a value X1+$\alpha$ as the X coordinate value of the second pixel intersection. As a result, as illustrated in FIG. 7B, the electronic device may generate a set region 705 by connecting the first pixel intersection (X1−$\alpha$, Y1) 703 and the second pixel intersection (X1+$\alpha$, Y2) 704 which have been obtained newly by applying the offset to the detected X coordinates.

According to another exemplary method, as illustrated in FIG. 7A, when the X coordinate of the point (first pixel intersection) 701 of a first touch is coincident with the X coordinate of the point (second pixel intersection) 702 of a second touch in the electronic device, the square of a difference value (Y1−Y2) between the Y coordinate value (Y1) of the point of the first touch and the Y coordinate value (Y2) of the point of the second touch may be substituted for the area of the set region. That is, $(Y1-Y2)^2$ may be regarded as the area of the set region.

Figure 8A:
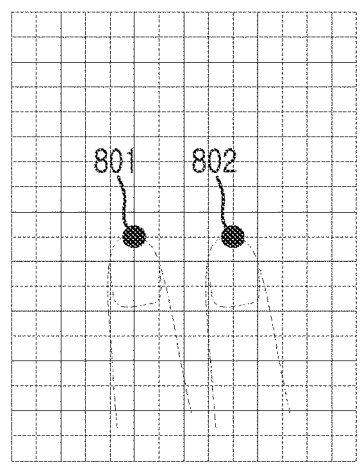
FIGS. 8A and 8B are diagrams illustrating use of an offset when it is determined that the Y coordinate of a first pixel intersection is coincident with that of a second pixel intersection according to an exemplary embodiment of the present invention.
Figure 8B:
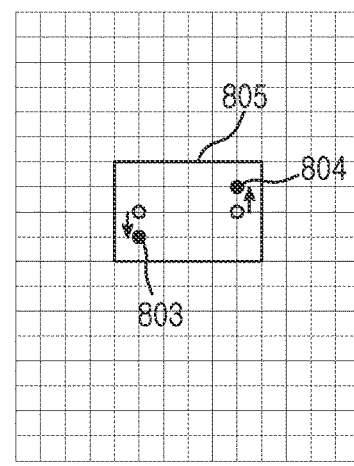

FIGS. 8A and 8B are diagrams illustrating use of an offset when it is determined that the Y coordinate of a first pixel intersection is coincident with that of a second pixel intersection according to an exemplary embodiment of the present invention.

Referring to FIG. 8A, the electronic device may detect that two regions are touched on the region of content displayed on the touchscreen, and detect a first pixel intersection 801 and a second pixel intersection 802 respectively closest to the touch regions. More specifically, when two regions are touched on content displayed on the touchscreen, the electronic device may detect the first pixel intersection 801 and the second pixel intersection 802 that are pixel intersections respectively closest to the touch regions. Thereafter, the electronic device may generate a rectangle that is a region set that has a diagonal line connecting the detected first pixel intersection 801 and second pixel intersection 802 and includes at least one pixel.

However, as illustrated in FIG. 8A, when it is determined that the Y coordinate of the detected first pixel intersection 801 is coincident (e.g., collinear) with that of the detected second pixel intersection 802, the electronic device cannot generate the set region. More specifically, the electronic device performs an algorithm for generating the set region that has the diagonal line connecting the first pixel intersection 801 first detected and second pixel intersection 802. If the first pixel intersection 801 is coincident with the second pixel intersection 802, a problem that the algorithm cannot be performed may occur. Accordingly, when it is determined that the detected first pixel intersection 801 is coincident with the second pixel intersection 802, the electronic device may apply an offset to their respective Y coordinates. More specifically, the electronic device may subtract a set $\alpha$ value from the Y coordinate value of the first pixel or add the set $\alpha$ value to the Y coordinate value of the second pixel. For example, it is assumed that the Y coordinate of the first pixel detected in the electronic device is Y1, and the Y coordinate of the detected second pixel is also Y1. As in the above-described assumption, when the Y coordinate of the first pixel is coincident with the Y coordinate of the second pixel as Y1, the electronic device may subtract the set $\alpha$ value from the Y coordinate value Y1 of the first pixel, or add the set $\alpha$ value to the Y coordinate value Y1 of the second pixel. Accordingly, the electronic device may obtain a value Y1−$\alpha$ as the Y coordinate value of the first pixel intersection and a value Y1+$\alpha$ as the X coordinate value of the second pixel intersection. As a result, as illustrated in FIG. 8B, the electronic device may generate a set region 805 by connecting the first pixel intersection (X1, Y1−$\alpha$) 803 and the second pixel intersection (X2, Y1+$\alpha$) 804 which have been obtained newly by applying the offset to the detected X coordinates.

According to another exemplary method, as illustrated in FIG. 8A, when the Y coordinate of the point (first pixel intersection) 801 of a first touch is coincident with the Y coordinate of the point (second pixel intersection) 802 of a second touch in the electronic device, the square of a difference value (X1−X2) between the X coordinate value (X1) of the point of the first touch and the Y coordinate value (X2) of the point of the second touch may be substituted for the area of the set region. That is, $(X1-X2)^2$ may be regarded as the area of the set region.

Figure 9:
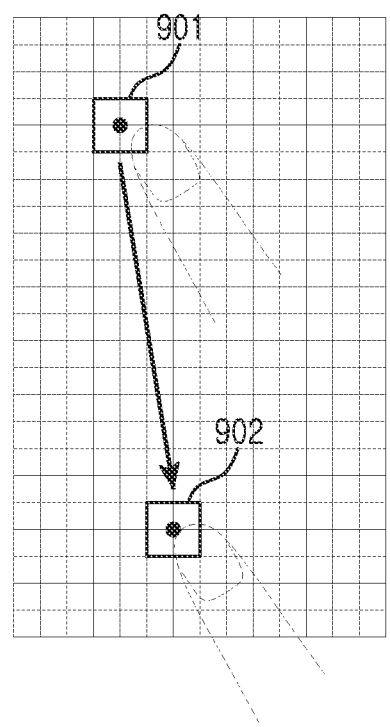
FIG. 9 is a diagram schematically illustrating reception of one touch input and scrolling displayed content according to an exemplary embodiment of the present invention.

FIG. 9 is a diagram schematically illustrating reception of one touch input and scrolling displayed content according to an exemplary embodiment of the present invention.

As illustrated in FIG. 9, an electronic device according to the present invention may receive one touch input and scroll a content region displayed on a touchscreen. Even in a case of receiving one touch input, when an additional condition is assigned, it is possible to scroll or magnify/de-magnify the content region displayed on the touchscreen.

Referring to FIG. 9, a case of scrolling a content region displayed on the touchscreen will be described below. First, the electronic device may measure a variation in the number of pixels included in a region 901 generated according to the movement of a touch region, and determine the measured variation in the number of pixels. Thereafter, when it is determined that the determined variation in the number of pixels is equal to or greater than a first set variation and is smaller than a second set variation, the electronic device may scroll the content to a region to which the touch region has moved. For example, it is assumed that the number of pixels included in the region 901 firstly generated is 4, a first set variation is 0 and a second set variation is 10. In the assumption, when the variation in the number of pixels from the number (4) of pixels generated by an initial touch input to the number of pixels generated by the moved touch input is measured as 0, the electronic device may scroll the content displayed on the touchscreen to a region to which the touch region has moved. In the assumption, when the variation from the number of pixels generated by an initial touch input to the number of pixels within a region 902 newly generated by the moved touch input is determined to be equal to or greater than the first set variation and smaller than the second set variation, the electronic device may scroll the content displayed on the touchscreen to a region to which the touch region has moved.

In addition, the electronic device may measure a variation in the area of the region 902 generated according to the movement of a touch region, and determine the measured variation in the area. Thereafter, when it is determined that the determined variation in the area is equal to or greater than a first set variation and is smaller than a second set variation, the electronic device may scroll the content to a region to which the touch region has moved. For example, it is assumed that the area of the generated region is 84 mm$^2$, the first set variation is 0 mm$^2$ and the second set variation is 20 mm$^2$. In the assumption, when the area variation from the area (82 mm$^2$) of a region generated by an initial touch input to the area of a region generated by the moved touch input is measured as 0 mm$^2$, the electronic device may scroll the content displayed on the touchscreen to a region to which the touch region has moved. In the assumption, when the area variation from the area of the region 901 generated by an initial touch input to the area of the region 902 newly generated by the moved touch input is determined to be equal to or greater than a first set variation and smaller than a second set variation, the electronic device may scroll the content displayed on the touchscreen to a region to which the touch region has moved.

Figure 10:
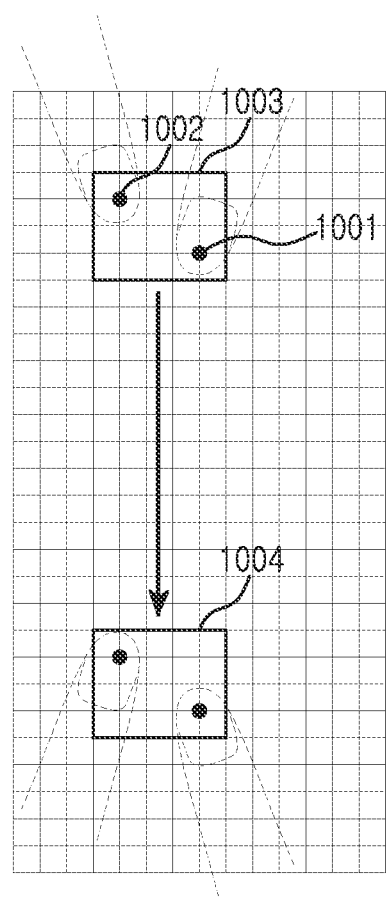
FIG. 10 is a diagram schematically illustrating reception of two touch inputs and scrolling displayed content according to an exemplary embodiment of the present invention.

FIG. 10 is a diagram schematically illustrating reception of two touch inputs and scrolling displayed content according to an exemplary embodiment of the present invention.

Referring to FIG. 10, an electronic device may receive two touch inputs and scroll a content region displayed on a touchscreen. First, the electronic device may detect that two regions are touched on the region of content displayed on the touchscreen, and detect a first pixel intersection 1001 and a second pixel intersection 1002 respectively closest to the touch regions. More specifically, when detecting that the two regions are touched on the content displayed on the touchscreen, the electronic device may detect the first pixel intersection 1001 and the second pixel intersection 1002 that are pixel intersections respectively closest to the touch regions. Thereafter, the electronic device may generate a set region 1003 that has a diagonal line connecting the detected first pixel intersection 1001 and second pixel intersection 1002 and includes at least one pixel. Thereafter, the electronic device may generate a rectangle having a diagonal line connecting the detected first pixel intersection 1001 and second pixel intersection 1002 to generate the set region 1003 according to the present invention.

Thereafter, the electronic device may measure a variation in the number of pixels included in a region 1004 generated according to the movement of a touch region, and determine the measured variation in the number of pixels. Thereafter, when it is determined that the determined variation in the number of pixels is equal to or greater than a first set variation and smaller than a second set variation, the electronic device may scroll the content to a region to which a touch region has moved. For example, it is assumed that the number of pixels included in the generated region 1003 is 20, the first set variation is 0 and the second set variation is 20. In the assumption, when the variation in the number of pixels due to the movement of the touch input from the number of pixels, 20, generated by an initial touch input is measured as 0, the electronic device may scroll the content displayed on the touchscreen to a region to which the touch region has moved. In the assumption, when the variation in the number of pixels within a region 1004 newly generated by the moved touch input from the number of pixels generated by an initial touch input is determined to be equal to or greater than a first set variation and is smaller than a second set variation, the electronic device may scroll the content displayed on the touchscreen to a region to which the touch region has moved.

In addition, the electronic device may measure a variation in the area of the region 1004 generated according to the movement of a touch region, and determine the measured variation in the area. Thereafter, when it is determined that the determined variation in the area is equal to or greater than a first set variation and smaller than a second set variation, the electronic device may scroll the content to a region to which the touch region has moved. For example, it is assumed that the area of the generated region is 84 mm$^2$, the first set variation is 0 mm$^2$ and the second set variation is 20 mm$^2$. In the assumption, when the variation in area due to the movement of the touch input from 84 mm$^2$ that is the area of a region generated by an initial touch input is measured as 15 mm$^2$, the electronic device may scroll the content displayed on the touchscreen to a region to which the touch region has moved. In the assumption, when the variation in area from the area of the region 1003 generated by an initial touch input to the area of the region 1004 newly generated by the movement of the touch input is determined to be equal to or greater than the first set variation and smaller than the second set variation, the electronic device may scroll the content displayed on the touchscreen to a region to which the touch region has moved.

Figure 11:
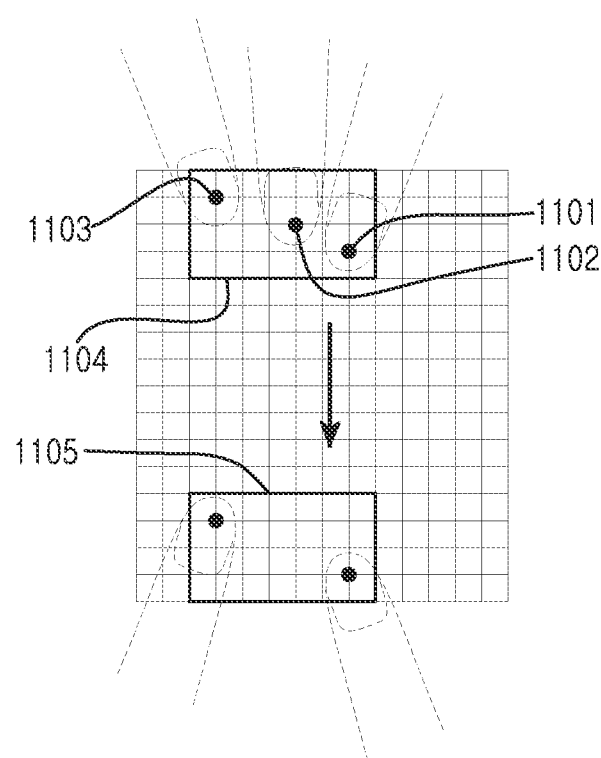
FIG. 11 is a diagram schematically illustrating reception of multi touch input and scrolling displayed content according to an exemplary embodiment of the present invention.

FIG. 11 is a diagram schematically illustrating reception of multi touch input and scrolling displayed content according to an exemplary embodiment of the present invention.

Referring to FIG. 11, the electronic device detects three touch inputs 1101, 1102 and 1103 on a region of content displayed on a touchscreen. The electronic device compares the X coordinate values and Y coordinate values of the respective detected touch inputs, and determines the maximum value and minimum value of the X coordinate values and the maximum value and minimum value of the Y coordinate values. Thereafter, the electronic device sets a second rectangle (box) 1104 defined by the maximum and minimum coordinate values. When two touches are moved (i.e., dragged) and one touch is removed, the electronic device determines the area of a third rectangle (box) 1105 formed by the maximum and minimum values of the X and Y coordinates of the two touch points. When the difference between the area of the third rectangle 105 and the area of the second rectangle 104 is below a threshold (also referred to as an offset), the movement of the touch is determined as a scrolling of the content region. In this case, the content region is scrolled and displayed. In the example of FIG. 11, the scrolling corresponds to scrolling down.

The threshold is a value determined in advance according to the function settings of the electronic device, and may be changed according to the user's settings.

As described with reference to FIG. 4A, a process for comparing the area (size) of a first rectangle formed by a first touch included in a second touch with the area of a second rectangle formed by the second touch and, when the area of the second rectangle is greater than a first preset threshold, determining the first and second touches as an event for scrolling or magnification/de-magnification of the content region displayed on the touchscreen may be further performed before the process of detecting the three touch inputs 1101, 1102 and 1103 on the region of content displayed on the touchscreen.

The region of the content displayed on the touchscreen of the electronic device may indicate an object displayed on the touchscreen of the electronic device. The object may be a graphical object.

Figure 12:
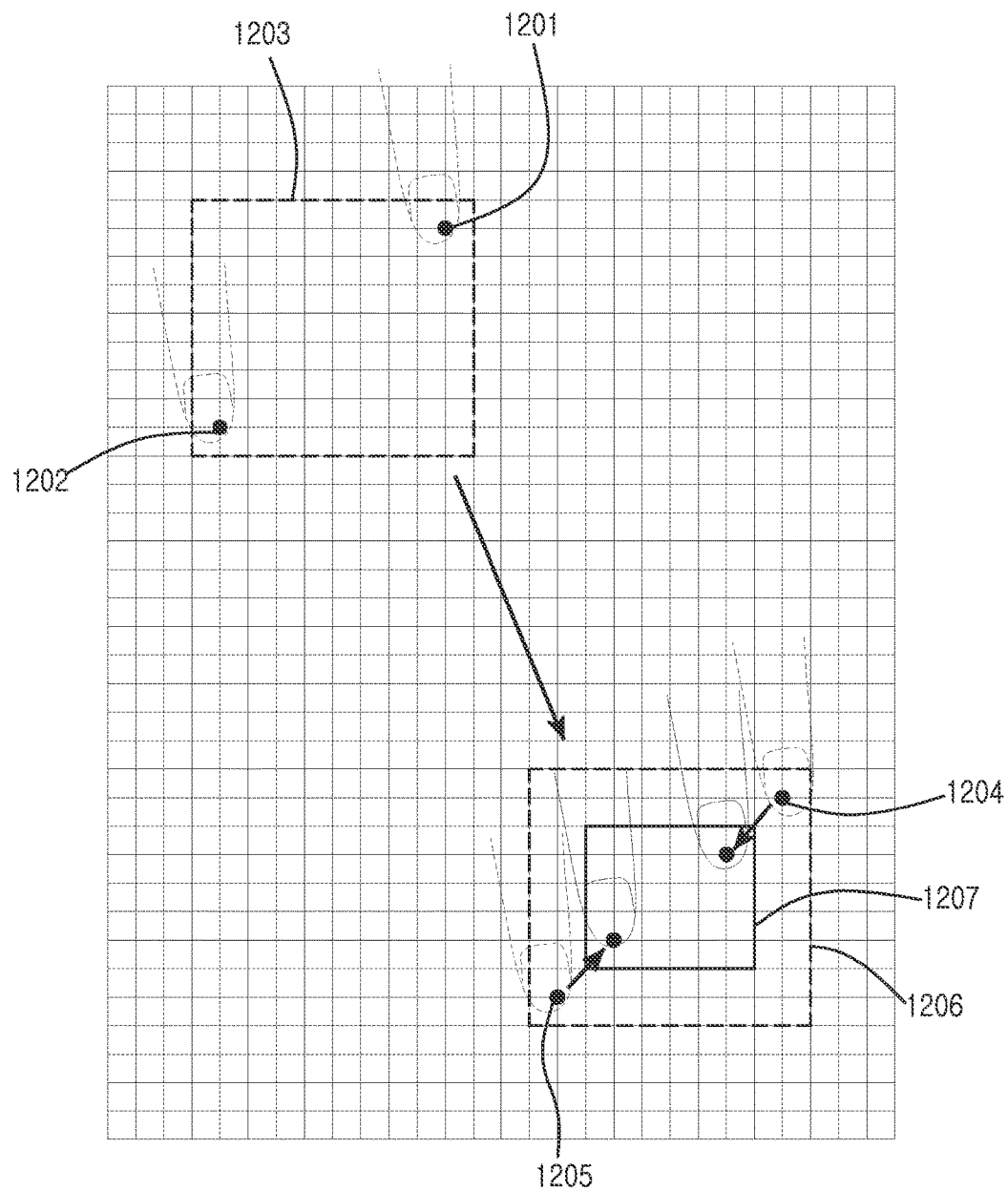
FIG. 12 is a diagram schematically illustrating reception of two touch inputs and de-magnifying displayed content according to an exemplary embodiment of the present invention.

FIG. 12 is a diagram schematically illustrating reception of two touch inputs and de-magnifying displayed content according to an exemplary embodiment of the present invention.

Referring to FIG. 12, the electronic device detects two touch inputs 1201 and 1202 on a region of content displayed on a touchscreen, and compares the X coordinate values and Y coordinate values of the respective detected touch inputs. Thereafter, the electronic device determines the maximum value and minimum value (in this exemplary embodiment, the maximum X coordinate value and the minimum X coordinate value are offset from each other by a constant distance) of the X coordinate values and the maximum value and minimum value (in this exemplary embodiment, the maximum Y coordinate value and the minimum Y coordinate value are offset from each other by a constant distance) of the Y coordinate values, and sets a second rectangle (box) 1203 defined by those coordinate values. Thereafter, the electronic device determines an area of a third rectangle (box) 1207 formed by the maximum and minimum values (are offset from each other by a constant distance) of the X and Y coordinates of touch points generated as the two touches (denoted as touches 1204 and 1205) are moved (i.e., dragged). As illustrated in FIG. 12, the area of the third rectangle 1207 is smaller than the area of the second rectangle 1203 (denoted as rectangle 1206). That is, the difference between the maximum value and minimum value of the X or Y coordinates is smaller than that before the touch movement. When the area difference between the rectangles exceeds a preset threshold, the movement of the touch is determined as the magnification (zoom-in) of the content region. In this case, the content region is magnified and displayed on the touchscreen.

A de-magnification ratio of the content region may be proportional to the difference between the area of the third rectangle 1207 and the area of the second rectangle 1203. The proportion may be one-dimensional proportion or multi-dimensional proportion. That is, a de-magnification value of the content region may be defined by a linear equation or multi-dimensional equation having, as a variable, the difference between the area of the third rectangle and the area of the second rectangle.

Instead of the areas of the second rectangle 1203 and third rectangle 1207, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

As described with reference to FIG. 4A, the process of regarding touch inputs as the event for scrolling or magnifying/de-magnifying the region of content displayed on the touchscreen may be further performed before the process of detecting two touch inputs 1201 and 1202 on the region of content displayed on the touchscreen by the electronic device.

The threshold is a value determined in advance according to the function settings of the electronic device, and may be changed according to the user's settings.

The magnification of the region of content displayed on the touchscreen of the electronic device may be adjusting a parameter of an object displayed on the touchscreen of the electronic device to a greater extent.

Figure 13:
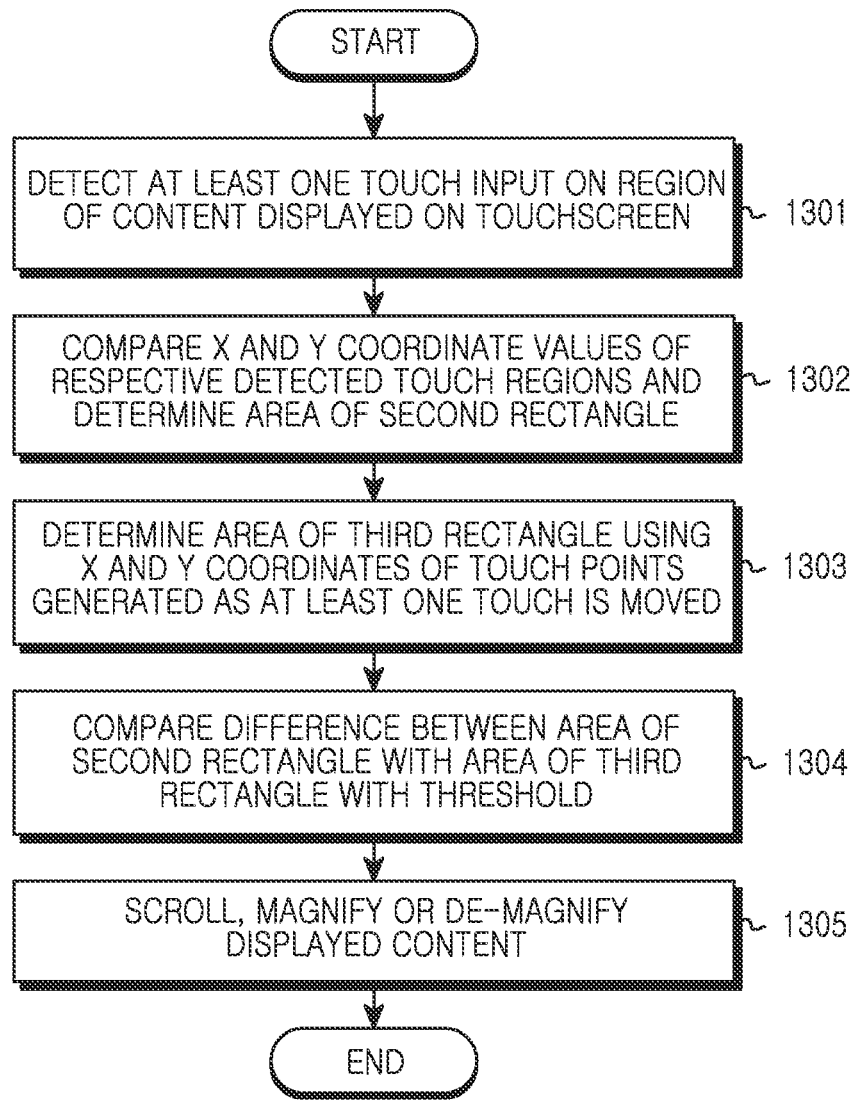
FIG. 13 is a flowchart of a method for adjusting a touch region in an electronic device according to an exemplary embodiment of the present invention.

FIG. 13 is a flowchart of a method for adjusting a touch region in an electronic device according to an exemplary embodiment of the present invention.

Referring to FIG. 13, the electronic device detects at least one touch (second touch) on the region of content displayed in operation 1301 and determines the area of a second rectangle formed by the detected touch in operation 1302. Thereafter, the electronic device determines the area of a third rectangle formed by third touches generated by the movement of the detected touch in operation 1303. The electronic device compares the areas of the rectangles and determines a function of the touch on the content region in operation 1304. The function of touch may represent the magnification/de-magnification of the region of content displayed on the touchscreen of the electronic device. The function of touch may represent the scrolling of the content region. The electronic device displays the content region according to a function determined by performing the above-described method in operation 1305.

The second rectangle and the third rectangle having four vertexes are determined according to minimum and maximum values among X and Y coordinate values of coordinates of the second and third touch points. The area of the third rectangle is compared with the area of the second rectangle. When the area of the third rectangle is greater than the area of the second rectangle by more than a preset threshold, the second and third touches magnify the region of content displayed on the touchscreen according to the variation in area. An example in which the area of the third rectangle is greater than the area of the second rectangle by more than a preset threshold is illustrated in FIG. 1C. When the area of the third rectangle is smaller than the area of the second rectangle by more than a preset second threshold (also expressed as an offset), the region of content displayed on the touchscreen is de-magnified by the second touch and the third touches according to a variation ratio in area. An example in which the area of the third rectangle is smaller than the area of the second rectangle by more than a preset threshold is illustrated in FIG. 1D.

A magnification or de-magnification ratio of the content region may be proportional to the difference between the area of the third rectangle and the area of the second rectangle. The proportion may be one-dimensional proportion or multi-dimensional proportion. That is, a magnification or de-magnification value of the content region may be defined by a linear equation or multi-dimensional equation having, as a variable, the difference between the area of the third rectangle and the area of the second rectangle.

Instead of the areas of the second rectangle and third rectangle, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

The threshold is a value determined in advance according to the function settings of the electronic device, and may be changed according to the user's settings.

The second touch may be a plurality of touches, and the plurality of touches may include a first touch generated first on the region of content displayed on the screen of the electronic device. The relationship may be same as described with reference to FIG. 4A.

That is, the area (size) of a first rectangle formed by a first touch included in a second touch is compared with the area of a second rectangle formed by the second touch. A process for determining the first and second touches as an event for scrolling or magnification/de-magnification of the region of content displayed on the touchscreen when the area of the second rectangle is greater than a first preset threshold may be further performed before the process in operation 1301 of detecting at least one touch (second touch) on the region of content displayed on the touchscreen.

The region of the content displayed on the touchscreen of the electronic device may indicate an object displayed on the touchscreen of the electronic device. In an exemplary implementation, the object may be a graphical object.

The magnification or de-magnification of the content region is the adjustment of a parameter of an object displayed on the touchscreen of the electronic device.

The scrolling of the content region is may be the scrolling of an object displayed on the touchscreen of the electronic device.

Adjusting a parameter of the object displayed on the touchscreen of the electronic device may represent magnifying (zooming-in) or de-magnifying (zooming-out) the area of the content displayed on the touchscreen of the electronic device. Scrolling the object displayed on the touchscreen of the electronic device may represent scrolling up or scrolling down the content displayed on the touchscreen of the electronic device.

Figure 14:
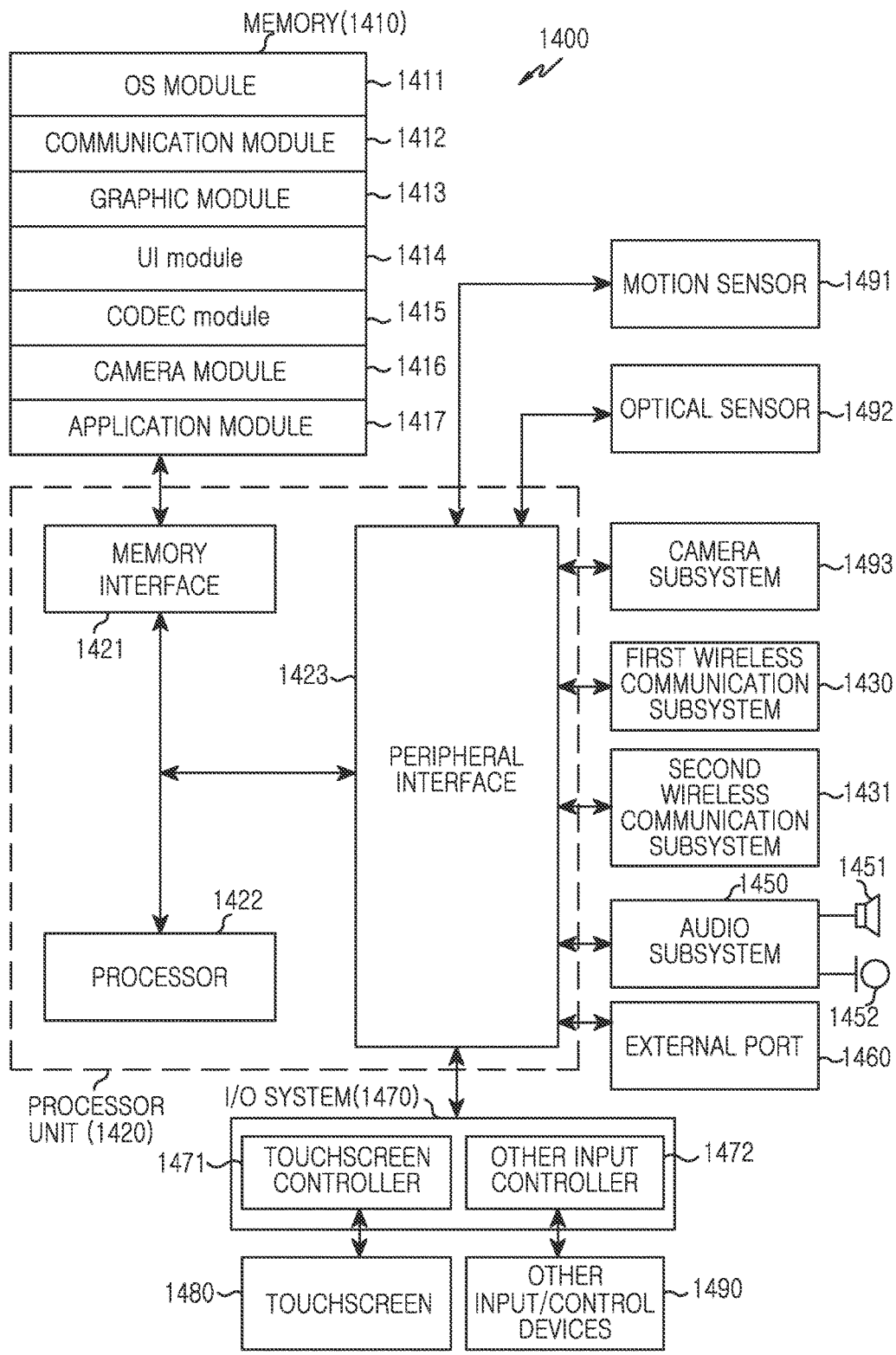
FIG. 14 is a block diagram illustrating a configuration of an electronic device according to an exemplary embodiment of the present invention.

FIG. 14 is a block diagram illustrating a configuration of an electronic device according to an exemplary embodiment of the present invention.

Referring to FIG. 14, an electronic device 1400 may be a portable electronic device, and examples thereof may include a portable terminal, a mobile phone, a mobile pad, a media player, a tablet computer, a handheld computer, or a Personal Digital Assistant (PDA), and the like. In addition, the electronic device may be any one portable electronic device including a device having two or more functions among the above-described devices.

The electronic device 1400 includes a memory 1410, a processor unit 1420, a first wireless communication subsystem 1430, a second wireless communication subsystem 1431, an external port 1460, an audio subsystem 1450, a speaker 1451, a microphone 1452, an Input/Output (I/O) system 1470, a touchscreen 1480, and other input/control devices 1490. The memory 1410 and the external port 1460 may be provided in plurality.

The processor unit 1420 may include a memory interface 1421, at least one processor 1422, and a peripheral interface 1423. In some cases, the processor unit 1420 will also be referred to as a processor.

In an exemplary implementation, the processor unit 1420 detects at least one first touch on a region of content displayed on the touchscreen, determines an area of a first rectangle formed by the detected touch, determines an area of a second rectangle formed by third touches generated by the detected touch, compares the area of the first rectangle with the area of the second rectangle, determines a function of the touch on the content region, and displays the content region on the touchscreen.

The processor 1422 executes various software programs to perform various functions for the electronic device 1400, and performs processes and controls for voice communication and data communication. In addition to these general functions, the processor 1422 executes a specific software module (instruction set) stored in the memory 1410 and performs various specific functions corresponding to the software module. That is, the processor 1422 performs methods of exemplary embodiments of the present invention described herein in cooperation with software modules stored in the memory 1410.

The processor 1422 may include at least one data processor, image processor, codec, and the like. The data processor, the image processor, the codec, etc. may be configured separately. Also, the processor 1422 may be configured by a plurality of processors performing different functions. The peripheral interface 1423 connects various peripheral devices and the I/O system 1470 of the electronic device 1400 to the processor 1422 and the memory 1410 (through the memory interface 1421).

The various elements of the electronic device 1400 may be coupled by at least one communication bus (not illustrated) or stream line (not illustrated).

The external port 1460 is used for connection to other electronic devices directly or indirectly through a network (e.g., Internet, intranet, wireless LAN, etc.). The external port 1460 may be, for example, a Universal Serial Bus (USB) port, a FireWire port, etc., but is not limited thereto.

A motion sensor 1491 and an optical sensor 1492 may be connected to the peripheral interface 1423 to enable various functions. For example, the motion sensor 1491 and the optical sensor 1492 may be connected to the peripheral interface 1423 to detect a motion of the electronic device and detect an external source of light. In addition, other sensors such as a positioning system, a temperature sensor, and a biosensor may be connected to the peripheral interface 1423 to perform relevant functions.

A camera subsystem 1493 may perform camera functions such as photographing and video clip recording.

The optical sensor 1492 may include a Charged Coupled Device (CCD) or a Complementary Metal-Oxide Semiconductor (CMOS) device.

A communication function is performed through one or more wireless communication subsystems 1430 and 1431. The communication systems 1430 and 1431 may include a Radio Frequency (RF) receiver and transceiver, an optical (e.g., infrared) receiver and transceiver, and the like. The first wireless communication subsystem 1430 and the second wireless communication subsystem 1431 may be divided according to communication networks through which the electronic device 1400 communicates. For example, the communication networks may include, but are not limited to, communication subsystems operated through a Global System for Mobile Communication (GSM) network, an Enhanced Data GSM Environment (EDGE) network, a Code Division Multiple Access (CDMA) network, a Wideband-Code Division Multiple Access (W-CDMA) network, a Long Term Evolution (LTE) network, an Orthogonal Frequency Division Multiple Access (OFDMA) network, a Wireless Fidelity (WiFi) network, a WiMax network, a Bluetooth network, and the like. The first wireless communication subsystem 1430 and the second wireless communication subsystem 1431 may be combined with each other to be implemented with one wireless communication subsystem.

The audio subsystem 1450 is connected to the speaker 1451 and the microphone 1452 to perform audio input/output functions such as voice recognition, voice replication, digital recording, phone functions, and the like. That is, the audio subsystem 1450 communicates with the user through the speaker 1451 and the microphone 1452. The audio subsystem 1450 receives data through the peripheral interface 1423 of the processor unit 1420 and converts the received data into an electric stream. The electric stream is transmitted to the speaker 1451. The speaker 1451 converts the electric stream into sound waves audible by humans and outputs the same. The microphone 1452 converts sound waves received from humans or other sound sources into an electric stream. The audio subsystem 1450 receives an electric stream converted from the microphone 1452. The audio subsystem 1450 converts the received electric stream into an audio data stream and transmits the audio data stream to the peripheral interface 1423. The audio subsystem 1450 may include an attachable/detachable earphone, a headphone, or a headset.

The I/O subsystem 1470 may include a touchscreen controller 1471 and/or another input controller 1472. The touchscreen controller 1471 may be connected to the touchscreen 1480. The touchscreen 1480 and the touchscreen controller 1471 may detect a touch, a motion, a stop, etc., thereof by using multi-touch detection technologies including a proximity sensor array or other elements, as well as capacitive, resistive, infrared and surface acoustic wave technologies for determining one or more touch points with the touchscreen 1480. The other input controller 1472 may be connected to the other input/control devices 1490. The other input/control device 1490 may include one or more buttons, a rocker switch, a thumb wheel, a dial, a stick, and/or a pointer device such as a stylus.

The touchscreen 1480 provides an I/O interface between the electronic device 1400 and the user. That is, the touchscreen 1480 transmits a user touch input to the electronic device 1400. Also, the touchscreen 1480 is a medium that displays an output from the electronic device 1400 to the user. That is, the touchscreen 1480 displays a visual output to the user. The visual output may be represented by a text, a graphic, a video, or a combination thereof.

The touchscreen 1480 may use various display technologies. For example, the touchscreen 1480 may use a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED), and the like.

The memory 1410 may be connected to the memory interface 1421. The memory 1410 may include one or more high-speed Random Access Memories (RAMs) such as magnetic disk storage devices, one more nonvolatile memories, one or more optical storage devices, and/or one or more flash memories (for example, NAND flash memories or NOR flash memories).

The memory 1410 stores software. Elements of the software include an Operation System (OS) module 1411, a communication module 1412, a graphic module 1413, a User Interface (UI) module 1414, a codec module 1415, a camera module 1416, and one or more application modules 1417. Also, since the module that is an element of the software may be represented as a set of instructions, the module may be referred to as an instruction set. The module may also be referred to as a program. The OS module 1411 (for example, WINDOWS, LINUX, Darwin, RTXC, UNIX, OS X, or an embedded OS such as VxWorks) includes various software elements for controlling general system operations. For example, general system operation controls include memory control/management, storage hardware (device) control/management, and power control/management. The OS module 1411 also performs a function for enabling smooth communication between various hardware elements (devices) and software elements (modules).

The communication module 1412 may enable communication with other electronic devices (such as computers, servers, and/or portable terminals) through the wireless communication subsystems 1430 and 1431 or the external port 1460.

The graphic module 1413 includes various software elements for providing and displaying graphics on the touchscreen 1480. The graphics include texts, web pages, icons, digital images, videos, animations, etc.

The UI module 1414 includes various software elements related to a user interface. Through the user interface module, the electronic device provides information about how the state of a user interface changes and/or information about under what condition the state of a user interface changes.

The CODEC module 1415 may include software elements related to video file encoding/decoding. The codec module may include a video stream module such as an MPEG module or an H204 module. Also, the codec module may include various audio file codec modules such as AAA, AMR, WMA, etc. Also, the CODEC module 1415 includes an instruction set corresponding to the implementation methods of the present invention.

The camera module 1416 may include camera-related software elements that enable camera-related processes and functions.

The application module 1417 includes a browser application, an e-mail application, an instant message application, a word processing application, a keyboard emulation application, an address book application, a touch list application, a widget application, a Digital Rights Management (DRM) application, a voice recognition application, a voice replication application, a position determining function application, a Location-Based Service (LBS) application, and the like.

In addition, various functions of the electronic device 1400 according to the present invention, which have been described above and will be described below, may be implemented by any combination of hardware and/or software including one or more stream processors and/or an Application-Specific Integrated Circuit (ASIC).

For example, referring to FIGS. 1A to 1D, the present invention may provide a device including a touchscreen, at least one processor, a memory, and a program or instruction stored in the memory and executed by the processor, the program or instruction performing detecting at least one second touch on a displayed content region and determining an area of a second rectangle formed by the detected touch, determining an area of a third rectangle formed by third touches moved from the detected touch, and comparing the area of the second rectangle with the area of the third rectangle, determining a function of the touch on the content region, and displaying the content region. The displaying of the content region may represent scrolling of the content region or magnification/de-magnification of the content region.

A magnification or de-magnification ratio of the content region may be proportional to the difference between the area of the third rectangle and the area of the second rectangle. The proportion may be one-dimensional proportion or multi-dimensional proportion. That is, a magnification or de-magnification value of the content region may be defined by a linear equation or multi-dimensional equation having, as a variable, the difference between the area of the third rectangle and the area of the second rectangle.

Instead of the areas of the second rectangle and third rectangle, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

A condition of magnifying the region of content displayed on the touchscreen may be set differently. That is, a condition in which the area of a rectangle exceeds a reference value may be given as a condition of magnification of the region of content displayed. For example, when the reference value for the area of a rectangle is set to 4 cm², the region of content displayed is magnified from a time point at which the area of the second rectangle exceeds the reference value (it is assumed that the area of the first rectangle described with reference to FIG. 4A is equal to or smaller than the reference value). The magnification ratio for the content region may depend on a ratio at which the area of the second rectangle exceeds the reference value. If the area of the first rectangle is equal to or greater than the reference value, the displayed content region is magnified from a time point at which the area of the second rectangle exceeds the area of the first rectangle. The magnification ratio for the content region may depend on a ratio at which the area of the second rectangle exceeds the area of the first rectangle. A condition in which the area of a rectangle is smaller than the reference value may be given as a condition for de-magnification of the displayed content region (it is assumed that the area of the first rectangle which will be described below with reference to FIG. 4A is equal to or greater than the reference value).

Further, the above-described two conditions for magnification of the displayed content region may be used together. That is, the condition in which the area of a rectangle exceeds a reference value, and the condition in which the area of the third rectangle increases to be greater than the area of the second rectangle by more than a preset second threshold may be determined as conditions for magnification of the region of content displayed on the touchscreen. That is, the condition in which the area of a rectangle is smaller than a reference value, and the condition in which the area of the third rectangle decreases to be smaller than the area of the second rectangle by more than a preset second threshold may be determined as conditions for de-magnification of the region of content displayed on the touchscreen.

Figure 15A:
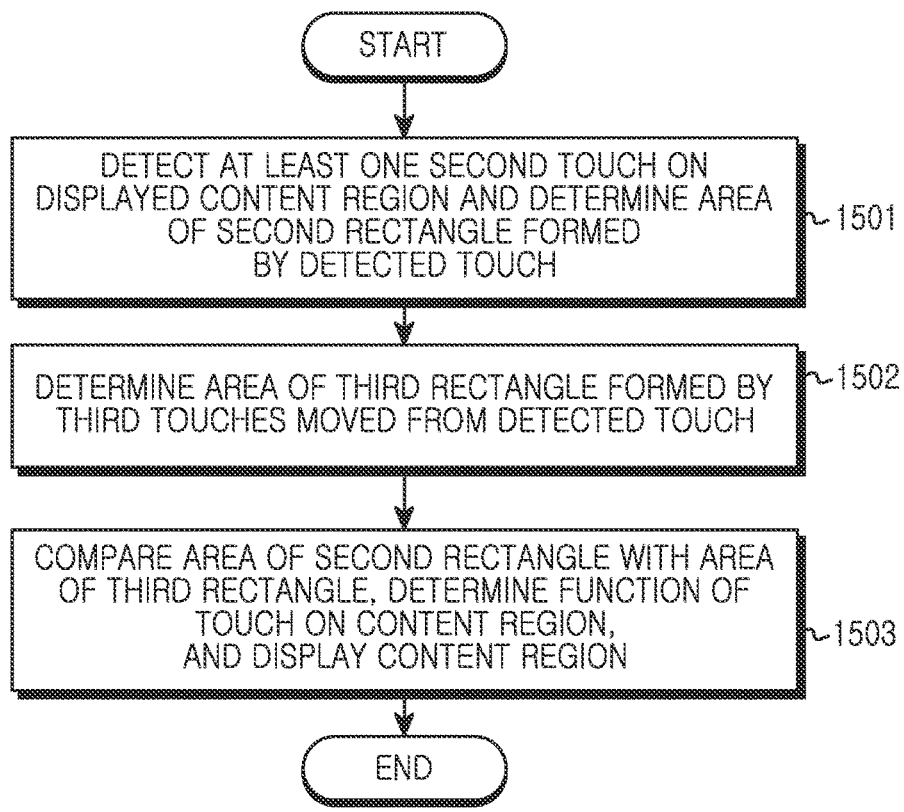
FIG. 15A is a flowchart illustrating a method for adjusting a touch region in an electronic device according to an exemplary embodiment of the present invention.

FIG. 15A is a flowchart illustrating a method for an electronic device for adjusting a touch region according to an exemplary embodiment of the present invention.

Referring to FIG. 15A, the electronic device detects at least one second touch on a region of content displayed and determines the area of a second rectangle formed by the detected touch in operation 1501. Thereafter, the electronic device determines the area of a third rectangle formed by third touches generated by the movement of the detected touch in operation 1502. The electronic device compares the area of the second rectangle with the area of the third rectangle to determine a function of the touch on the content region. The electronic device displays the content region according to a function determined by performing the above-described method in operation 1503.

The second rectangle and the third rectangle second rectangle having four vertexes determined according to minimum and maximum values among X and Y coordinate values of coordinates of the second and third touch points. The area of the third rectangle is compared with the area of the second rectangle. When the area of the third rectangle is greater than the area of the second rectangle by more than a preset threshold, the second and third touches magnify the region of content displayed on the touchscreen according to the variation in area. An example in which the area of the third rectangle is greater than the area of the second rectangle by more than a preset threshold is illustrated in FIG. 1C. When the area of the third rectangle is smaller than the area of the second rectangle by more than a preset second threshold (also expressed as an offset), the region of content displayed on the touchscreen is de-magnified by the second touch and the third touches according to the variation ratio between areas. An example in which the area of the third rectangle is smaller than the area of the second rectangle by more than a preset threshold is illustrated in FIG. 1D.

A magnification or de-magnification ratio of the content region may be proportional to the difference between the area of the third rectangle and the area of the second rectangle. The proportion may be one-dimensional proportion or multi-dimensional proportion. That is, a magnification or de-magnification value of the content region may be defined by a linear equation or multi-dimensional equation having, as a variable, the difference between the area of the third rectangle and the area of the second rectangle.

Instead of the areas of the second rectangle and third rectangle, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

The threshold is a value determined in advance according to the function settings of the electronic device, and may be changed according to the user's settings.

The second touch may be a plurality of touches, and the plurality of touches may include a first touch generated first on the region of content displayed on the screen of the electronic device. The relationship may be same as described with reference to FIG. 4A.

That is, a process for comparing the area (size) of a first rectangle formed by a first touch included in a second touch with the area of a second rectangle formed by the second touch and, when the area of the second rectangle is greater than a first preset threshold, determining the first and second touches as an event for scrolling or magnification/de-magnification of the content region displayed on the touchscreen may be further performed before the process in operation 1501 of detecting at least one second touch on the region of content displayed on the touchscreen and determining the area of the second rectangle formed by the detected touch.

The region of the content displayed on the touchscreen of the electronic device may indicate an object displayed on the touchscreen of the electronic device. In an exemplary implementation, the object may be a graphical object.

The magnification or de-magnification of the content region is the adjustment of a parameter of an object displayed on the touchscreen of the electronic device.

The scrolling of the content region is may be the scrolling of an object displayed on the touchscreen of the electronic device.

Adjusting a parameter of the object displayed on the touchscreen of the electronic device may represent magnifying (zooming-in) or de-magnifying (zooming-out) the area of the content displayed on the touchscreen of the electronic device. Scrolling the object displayed on the touchscreen of the electronic device may represent scrolling up or scrolling down the content displayed on the touchscreen of the electronic device.

A condition of magnifying the region of content displayed on the touchscreen may be set differently. That is, a condition in which the area of a rectangle exceeds a reference value may be given as a condition of magnification of the region of content displayed. For example, when the reference value for the area of a rectangle is set to 4 cm$^2$, the region of content displayed is magnified from a time point at which the area of the second rectangle exceeds the reference value (it is assumed that the area of the first rectangle illustrated in FIG. 4A is equal to or smaller than the reference value). The magnification ratio for the content region may depend on a ratio at which the area of the second rectangle exceeds the reference value. If the area of the first rectangle is equal to or greater than the reference value, the displayed content region is magnified from a time point at which the area of the second rectangle exceeds the area of the first rectangle. The magnification ratio for the content region may depend on a ratio at which the area of the second rectangle exceeds the area of the first rectangle. A condition in which the area of a rectangle is smaller than the reference value may be given as a condition for de-magnification of the displayed content region (it is assumed that the area of the first rectangle described below with reference to FIG. 4A is equal to or greater than the reference value).

Further, the above-described two conditions for magnification of the displayed content region may be used together. That is, the condition in which the area of a rectangle exceeds a reference value, and the condition in which the area of the third rectangle increases to be greater than the area of the second rectangle by more than a preset second threshold may be determined as conditions for magnification of the region of content displayed on the touchscreen. That is, the condition in which the area of a rectangle is smaller than a reference value, and the condition in which the area of the third rectangle decreases to be smaller than the area of the second rectangle by more than a preset second threshold may be determined as conditions for de-magnification of the region of content displayed on the touchscreen.

Figure 15B:
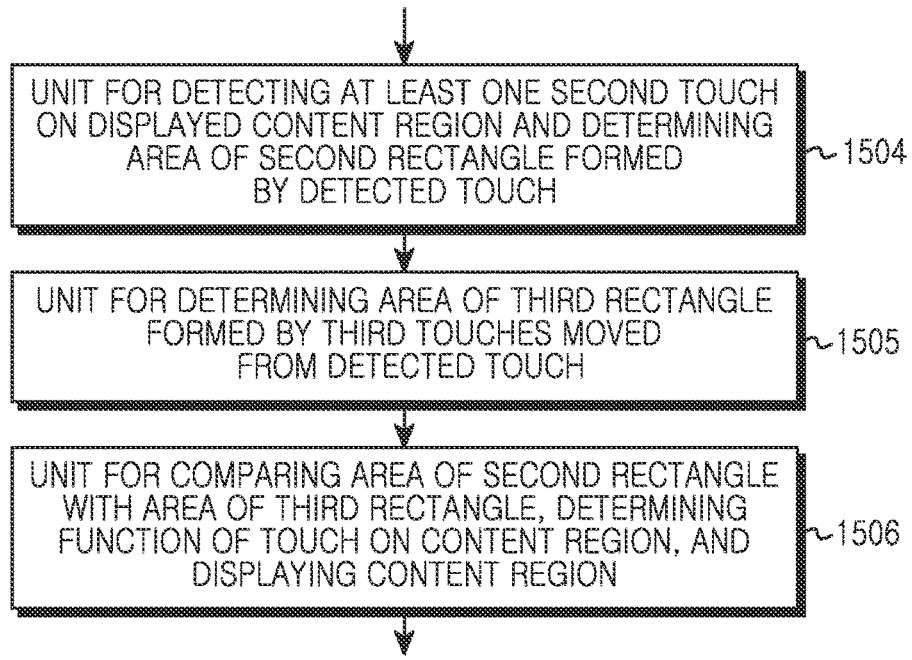
FIG. 15B is a block diagram of an electronic device for adjusting a touch region according to an exemplary embodiment of the present invention.

FIG. 15B is a block diagram of an electronic device for adjusting a touch region according to an exemplary embodiment of the present invention.

Referring to FIG. 15B, a second rectangle area determination unit 1504 of the electronic device detects at least one second touch on a displayed content region and determines the area of a second rectangle formed by the detected touch. A third rectangle area determination unit 1505 determines the area of a third rectangle formed by third touches generated by the movement of the detected touch. A display control unit 1506 compares the area of the second rectangle with the area of the third rectangle to determine a function of the touch on the content region. The display control unit 1506 performs control to display the content region according to a function determined by performing the above-described method.

The units may be included in a processor such as the processor unit 1420 of FIG. 14. Alternatively, the units may be included in the processor 1422 of FIG. 14.

The second rectangle and the third rectangle having four vertexes are determined according to minimum and maximum values among X and Y coordinate values of coordinates of the second and third touch points. The area of the third rectangle is compared with the area of the second rectangle. When the area of the third rectangle is greater than the area of the second rectangle by more than a preset threshold, the second and third touches magnify the region of content displayed on the touchscreen according to the variation in area. An example in which the area of the third rectangle is greater than the area of the second rectangle by more than a preset threshold is illustrated in FIG. 1C. When the area of the third rectangle is smaller than the area of the second rectangle by more than a preset second threshold (also expressed as an offset), the region of content displayed on the touchscreen is de-magnified by the second touch and the third touch according to the variation ratio between areas. An example in which the area of the third rectangle is smaller than the area of the second rectangle by more than a preset threshold is illustrated in FIG. 1D.

A magnification or de-magnification ratio of the content region may be proportional to the difference between the area of the third rectangle and the area of the second rectangle. The proportion may be one-dimensional proportion or multi-dimensional proportion. That is, a magnification or de-magnification value of the content region may be defined by a linear equation or multi-dimensional equation having, as a variable, the difference between the area of the third rectangle and the area of the second rectangle.

Instead of the areas of the second rectangle and third rectangle, the magnification value may be defined based on the sum of the product of differences between the X coordinate values and the product of differences between the Y coordinate values in the four points of the rectangle. That is, $(Xmax-Xmin)^2+(Ymax-Ymin)^2$ may be determined as a comparison reference instead of the areas of the rectangles (where Xmax is a maximum X coordinate value among the coordinates of the four points of the rectangle, Xmin is a minimum X coordinate value among the coordinates of the four points of the rectangle, Ymax is a maximum Y coordinate value among the coordinates of the four points of the rectangle, and Ymin is a minimum Y coordinate value among the coordinates of the four points of the rectangle).

The second touch may be a plurality of touches, and the plurality of touches may include a first touch generated first on the region of content displayed on the screen of the electronic device. The relationship is the same as described with reference to FIG. 4A.

That is, a unit for comparing the area (size) of a first rectangle formed by a first touch included in a second touch with the area of a second rectangle formed by the second touch and, when the area of the second rectangle is greater than a first preset threshold, determining the first and second touches as an event for scrolling or magnification/de-magnification of the region of content displayed on the touchscreen may be further included before the unit for detecting at least one second touch on the region of content displayed on the touchscreen and determining the area of the second rectangle formed by the detected touch.

The region of the content displayed on the touchscreen of the electronic device may indicate an object displayed on the touchscreen of the electronic device. In an exemplary implementation, the object may be a graphical object.

The magnification or de-magnification of the content region is the adjustment of a parameter of an object displayed on the touchscreen of the electronic device.

The scrolling of the content region may be the scrolling of an object displayed on the touchscreen of the electronic device.

Adjusting a parameter of the object displayed on the touchscreen of the electronic device may represent magnifying (zooming-in) or de-magnifying (zooming-out) the area of the content displayed on the touchscreen of the electronic device. Scrolling the object displayed on the touchscreen of the electronic device may represent scrolling up or scrolling down the content displayed on the touchscreen of the electronic device.

A condition of magnifying the region of content displayed on the touchscreen may be set differently. That is, a condition in which the area of a rectangle exceeds a reference value may be given as a condition of magnification of the region of content displayed. For example, when the reference value for the area of a rectangle is set to 4 cm², the displayed content region is magnified from a time point at which the area of the second rectangle exceeds the reference value (it is assumed that the area of the first rectangle illustrated in FIG. 4A is equal to or smaller than the reference value). The magnification ratio for the content region may depend on a ratio at which the area of the second rectangle exceeds the reference value. If the area of the first rectangle is equal to or greater than the reference value, the displayed content region is magnified from a time point at which the area of the second rectangle exceeds the area of the first rectangle. The magnification ratio for the content region may depend on a ratio at which the area of the second rectangle exceeds the area of the first rectangle. A condition in which the area of a rectangle is smaller than the reference value may be given as a condition for de-magnification of the displayed content region (it is assumed that the area of the first rectangle described below with reference to FIG. 4A is equal to or greater than the reference value).

Further, the above-described two conditions for magnification of the displayed content region may be used together. That is, the condition in which the area of a rectangle exceeds a reference value, and the condition in which the area of the third rectangle increases to be greater than the area of the second rectangle by more than a preset second threshold may be determined as conditions for magnification of the region of content displayed on the touchscreen. That is, the condition in which the area of a rectangle is smaller than a reference value, and the condition in which the area of the third rectangle decreases to be smaller than the area of the second rectangle by more than a preset second threshold may be determined as conditions for de-magnification of the region of content displayed on the touchscreen.

According to exemplary embodiments of the present invention, it is possible to implement a function based on touches on a content region by detecting at least one second touch on a displayed content region, determining the area of a second rectangle formed by the detected touch, determining the area of a third rectangle formed by third touches generated by the movement of the detected touch, and comparing the area of the second rectangle with that of the third rectangle.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating an electronic device, the method comprising:
    detecting at least one first touch on a content region displayed on a touchscreen;
    determining an area of a first region based on the at least one first touch, the area of the first region being determined to surround a plurality of touch points based on the at least one first touch;
    determining an area of a second region based on at least one second touch moved from the at least one first touch, the area of the second region being determined to surround a plurality of touch points based on the at least one second touch;
    determining a function on the content region by comparing the area of the first region with the area of the second region; and
    displaying the content region corresponding to the determined function,
    wherein the displaying of the content region comprises:
        scrolling, when a difference between the area of the second region and the area of the first region is below a threshold, the content region, and
    wherein the determining of the area of the first region or the area of the second region comprises:
        detecting a first pixel intersection and a second pixel intersection of the first region based on the at least one first touch or the second region based on the second touch,
        determining whether an X coordinate of the first pixel intersection and an X coordinate of the second pixel intersection or a Y coordinate of the first pixel intersection and a Y coordinate of the second pixel intersection are identical,
        if the X coordinate of the first pixel intersection and the X coordinate of the second pixel intersection or the Y coordinate of the first pixel intersection and the Y coordinate of the second pixel intersection are identical, adding an offset to the X coordinate of the first pixel intersection and subtracting the offset from the X coordinate of the second pixel intersection respectively or adding the offset to the Y coordinate of the first pixel intersection and subtracting the offset from the Y coordinate of the second pixel intersection respectively, and determining the area of the first region or the area of the second region by connecting the first pixel intersection to which the offset is added and the second pixel intersection from which the offset is subtracted.

2. The method of claim 1, wherein the displaying of the content region further comprises:

magnifying, when the area of the second region is greater than the area of the first region by more than a threshold, the content region.

3. The method of claim 1, wherein the displaying of the content region further comprises:

de-magnifying, when the area of the second region is smaller than the area of the first region by more than a threshold, the content region.

4. The method of claim 1, further comprising performing an event for scrolling the content region or magnifying/de-magnifying the content region before the determining of the area of the first region.

5. An electronic device, the electronic comprising:
a touchscreen;
at least one processor;
a memory; and
a program stored in the memory and executed by the processor, the program performing:
  detecting at least one first touch on a displayed content region displayed on a touchscreen,
  determining an area of a first region based on the at least one first touch, the area of the first region being determined to surround a plurality of touch points based on the at least one first touch,
  determining an area of a second region based on at least one second touch moved from the at least one first touch, the area of the second region being determined to surround a plurality of touch points based on the at least one second touch,
  determining a function on the content region by comparing the area of the first region with the area of the second region, and
  displaying the content region corresponding to the determined function,
  wherein the displaying of the content region comprises:
    scrolling, when a difference between the area of the second region and the area of the first region is below a threshold, the content region, and
  wherein the determining of the area of the first region or the area of the second region comprises:
    detecting a first pixel intersection and a second pixel intersection of the first region based on the at least one first touch or the second region based on the second touch,
    determining whether an X coordinate of the first pixel intersection and an X coordinate of the second pixel intersection or a Y coordinate of the first pixel intersection and a Y coordinate of the second pixel intersection are identical,
    if the X coordinate of the first pixel intersection and the X coordinate of the second pixel intersection or the Y coordinate of the first pixel intersection and the Y coordinate of the second pixel intersection are identical, adding an offset to the X coordinate of the first pixel intersection and subtracting the offset from the X coordinate of the second pixel intersection respectively or adding the offset to the Y coordinate of the first pixel intersection and subtracting the offset from the Y coordinate of the second pixel intersection respectively, and determining the area of the first region or the area of the second region by connecting the first pixel intersection to which the offset is added and the second pixel intersection from which the offset is subtracted.

6. The electronic device of claim 5, wherein the displaying of the content region further comprises:

magnifying, when the area of the second region is greater than the area of the first region by more than a threshold, the content region.

7. The electronic device of claim 5, wherein the displaying of the content region further comprises:

de-magnifying, when the area of the second region is smaller than the area of the first region by more than a threshold, the content region.

8. The electronic device of claim 5, wherein the program further performs an event for scrolling the content region or magnifying/de-magnifying the content region before the determining of the area of the first region.

9. An electronic device, the electronic comprising:
a touchscreen; and
a processor configured to:
  detect at least one first touch on a region of content displayed on the touchscreen,
  determine an area of a first region based on the detected at least one first touch, the area of the first region being determined to surround a plurality of touch points based on the at least one first touch,
  determine an area of a second region based on at least one third touch generated by the detected touch, the area of the second region being determined to surround a plurality of touch points based on the at least one second touch,
  determine a function on the content region by comparing the area of the first region with the area of the second region, and
  display the content region on the touchscreen corresponding to the determined function,
wherein the processor is further configured to:
  scroll a difference between the content region when the area of the second region and the area of the first region is below a threshold, and
wherein the determining of the area of the first region or the area of the second region comprises:
  detecting a first pixel intersection and a second pixel intersection of the first region based on the at least one first touch or the second region based on the second touch,
  determining whether an X coordinate of the first pixel intersection and an X coordinate of the second pixel intersection or a Y coordinate of the first pixel intersection and a Y coordinate of the second pixel intersection are identical,
  if the X coordinate of the first pixel intersection and the X coordinate of the second pixel intersection or the Y coordinate of the first pixel intersection and the Y coordinate of the second pixel intersection are identical, adding an offset to the X coordinate of the first pixel intersection and subtracting the offset from the X coordinate of the second pixel intersection respectively or adding the offset to the Y coordinate of the first pixel intersection and subtracting the offset from the Y coordinate of the second pixel intersection respectively, and determining the area of the first region or the area of the second region by connecting the first pixel intersection to which the offset is added and the second pixel intersection from which the offset is subtracted.

10. The electronic device of claim 9, wherein the processor is further configured to magnify the content region when the area of the second region is greater than the area of the first region by more than a threshold.

11. The electronic device of claim 9, wherein the processor is further configured to de-magnify the content region when the area of the second region is smaller than the area of the first region by more than a threshold.

* * * * *